(12) United States Patent
Filhaber et al.

(10) Patent No.: US 11,563,931 B2
(45) Date of Patent: Jan. 24, 2023

(54) SYSTEM AND METHOD FOR CALIBRATING A VISION SYSTEM WITH RESPECT TO A TOUCH PROBE

(71) Applicant: Cognex Corporation, Natick, MA (US)

(72) Inventors: John F. Filhaber, East Haddam, CT (US); Lowell D. Jacobson, Grafton, MA (US); George J. Costigan, Westford, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 17/102,235

(22) Filed: Nov. 23, 2020

(65) Prior Publication Data

US 2021/0176456 A1 Jun. 10, 2021

Related U.S. Application Data

(62) Division of application No. 14/885,974, filed on Oct. 16, 2015.
(Continued)

(51) Int. Cl.
*G01B 21/04* (2006.01)
*H04N 17/00* (2006.01)
(Continued)

(52) U.S. Cl.
CPC .......... *H04N 17/002* (2013.01); *G01B 5/012* (2013.01); *G01B 21/042* (2013.01); *G01B 21/20* (2013.01);
(Continued)

(58) Field of Classification Search
CPC .............. H04N 17/002; H04N 5/2253; H04N 5/23296; H04N 5/247; H04N 5/183;
(Continued)

(56) References Cited

U.S. PATENT DOCUMENTS 5,825,666 A * 10/1998 Freifeld ............... G01B 11/005
702/153
6,234,321 B1 5/2001 OConnor
(Continued)

FOREIGN PATENT DOCUMENTS

CN 1582384 A 2/2005
CN 102818532 A 12/2012
(Continued)

OTHER PUBLICATIONS

Kai, "Error Analysing for Adjusting Probe of Three Coordinate Measuring Machine", Machine Tool Work, Sep. 16, 2004, No. 2, Publisher: Qiqihar, Published in: China (With English Language Abstract).
(Continued)

*Primary Examiner* — Ayman A Abaza
(74) *Attorney, Agent, or Firm* — Loginov & Associates, PLLC; William A. Loginov

(57) ABSTRACT

A calibration fixture that enables more accurate calibration of a touch probe on, for example, a CMM, with respect to the camera. The camera is mounted so that its optical axis is approximately or substantially parallel with the z-axis of the probe. The probe and workpiece are in relative motion, along a plane defined by orthogonal x and y axes, and optionally the z-axis and/or and rotation R about the z-axis. The calibration fixture is arranged to image from beneath the touch surface of the probe and, via a 180-degree prism structure, to transmit light from the probe touch point along the optical axis to the camera. Alternatively, two cameras respectively view the fiducial location relative to the CMM arm and the probe location when aligned on the fiducial. The fixture can define an integrated assembly with an optics block and a camera assembly.

12 Claims, 15 Drawing Sheets

Related U.S. Application Data

(60) Provisional application No. 62/111,644, filed on Feb. 3, 2015, provisional application No. 62/098,894, filed on Dec. 31, 2014, provisional application No. 62/067,957, filed on Oct. 23, 2014.

(51) Int. Cl.
| | |
|---|---|
| *G01B 5/012* | (2006.01) |
| *G12B 5/00* | (2006.01) |
| *G01B 21/20* | (2006.01) |
| *H04N 5/225* | (2006.01) |
| *H04N 5/232* | (2006.01) |
| *H04N 5/247* | (2006.01) |
| *H04N 7/18* | (2006.01) |

(52) U.S. Cl.
CPC ............ *G12B 5/00* (2013.01); *H04N 5/2253* (2013.01); *H04N 5/23296* (2013.01); *H04N 5/247* (2013.01); *H04N 7/183* (2013.01)

(58) Field of Classification Search
CPC ............ G01B 21/042; G01B 5/00–003; G01B 11/00–30; G01B 21/00–32
USPC ........................................................ 348/95
See application file for complete search history.

(56) References Cited

U.S. PATENT DOCUMENTS

| | | | |
|---|---|---|---|
| 6,530,148 | B1 | 3/2003 | Kister |
| 2009/0195790 | A1 | 8/2009 | Zhu |
| 2010/0286812 | A1* | 11/2010 | Slettemoen ............ B23Q 17/24 |
| | | | 700/160 |
| 2011/0085177 | A1 | 4/2011 | Fukumoto |
| 2012/0200531 | A1 | 8/2012 | Araki |
| 2014/0300729 | A1 | 10/2014 | Drescher |
| 2015/0285616 | A1* | 10/2015 | Jordil ................... G01B 11/005 |
| | | | 348/135 |

FOREIGN PATENT DOCUMENTS

| | | | |
|---|---|---|---|
| CN | 102901473 | A | 1/2013 |
| CN | 203484311 | U | 3/2014 |
| CN | 104897068 | A | 9/2015 |
| DE | 4327250 | A1 | 3/1994 |
| DE | 102006001531 | A1 | 3/2007 |
| EP | 0614517 | B1 | 3/1997 |
| EP | 2312263 | A1 | 4/2011 |
| JP | H07505958 | A | 6/1995 |
| JP | 2006267032 | A * | 10/2006 |
| JP | 2006267032 | A | 10/2006 |
| WO | 9912082 | A1 | 3/1999 |
| WO | 2006128733 | A2 | 12/2006 |

OTHER PUBLICATIONS

Cai-Li, "Error Analysis and the Method of Compensating Probe of Three Coordinate Measurement Machine", "School of Mechanical Automotive Engineering, Zhejiang", Apr. 6, 2011, Publisher Universuty of Science and Technology, Hangzhou, Published in: China (With English Language Abstract).

* cited by examiner

SYSTEM AND METHOD FOR CALIBRATING A VISION SYSTEM WITH RESPECT TO A TOUCH PROBE

RELATED APPLICATIONS

This application is a divisional of U.S. patent application Ser. No. 14/885,974, filed Oct. 16, 2015, entitled SYSTEM AND METHOD FOR CALIBRATING A VISION SYSTEM WITH RESPECT TO A TOUCH PROBE, and claims the benefit of U.S. Provisional Application Ser. No. 62/111,644, filed Feb. 3, 2015, entitled SYSTEM AND METHOD FOR CALIBRATING A VISION SYSTEM WITH RESPECT TO A TOUCH PROBE, U.S. Provisional Application Ser. No. 62/098,894, filed Dec. 31, 2014, entitled SYSTEM AND METHOD FOR CALIBRATING A VISION SYSTEM WITH RESPECT TO A TOUCH PROBE, and U.S. Provisional Application Ser. No. 62/067,957, filed Oct. 23, 2014, entitled SYSTEM AND METHOD FOR CALIBRATING A VISION SYSTEM WITH RESPECT TO A TOUCH PROBE, the entire disclosure of each of which applications is herein incorporated by reference.

FIELD OF THE INVENTION

This invention relates to machine vision systems and more particularly to calibration of vision systems used in inspection and manufacturing processes.

BACKGROUND OF THE INVENTION

In manufacturing and assembly processes, it is often desirable to measure an object surface with a high degree of accuracy. One technique for performing such measurements with high accuracy (e.g. on the order of microns) and low noise is to employ a coordinate measuring machine (CMM). The CMM applies a touch probe to the surface of the object, which can be mounted on a moving motion stage (or, alternatively, the touch probe can be moved). As motion occurs (e.g. in the physical x and physical y-coordinate directions along a plane) the probe contacts a number of locations along the object surface, thereby generating a map of the overall displacement (e.g. in the physical z-coordinate direction) with respect to various locations on the object surface.

A challenge in use of a touch probe in a manufacturing environment—e.g. assembly and/or quality control—is in positioning the touch probe to an appropriate location on the workpiece under inspection. For example, certain elements within the workpiece are touched by the probe to determine functionality or proper dimensions. Often, the workpiece is located on a moving surface, such as a motion stage, or it can be mounted in a fixture in the inspection area. The touch probe moves relative to the workpiece according to a mapping between the touch probe/CMM internal coordinate system (x, y, z and rotation R) and the workpiece coordinate system. Thus, registering the probe's coordinate system with respect to the workpiece coordinate system typically requires that certain reference points on the workpiece be identified and mapped. For example, the workpiece can contain known edges and corners that are used as reference points or datums. The workpiece can also include predetermined fiducials, such as printed crosses, etc., which can be used to establish initial reference points for the motion of the touch probe. Also, these fiducials may be free of any surface relief (variation in z-axis height, for example) that could otherwise be detected by the touch probe, thereby relying exclusively on visual features to find a reference point.

The use of machine vision systems (also herein termed simply "vision systems") to assist in guiding (positioning) a robotic component—e.g. an end effector, part handler, etc. around a workspace is known in the art. Typically, such vision systems consist of one or more cameras mounted to image the scene containing the robotic components and the workpiece. Each camera includes an image sensor or "imager" based upon CCD, CMOS or another appropriate imaging technology in grayscale or color. The imager provides image data to a processor that can be integrated with the camera body and/or can be situated in a remote computing device such as a standalone PC, laptop, tablet, smartphone, or the like, connected via appropriate wired and/or wireless links. The processor includes a vision system application/process having various functionalities, such as, but not limited to, edge-detection and blob-analysis tools, general pattern-recognition tools, alignment tools and/or inspection tools. These functions and tools enable the vision system to recognize features on the workpiece and align it with respect to an internal coordinate system that is established during a training and calibration phase that precedes runtime operation.

The use of vision systems in conjunction with a touch probe offer certain challenges in that the locating of the touch point on the touch probe may be obscured during runtime and in general, a good viewing angle for the camera is difficult to attain. More generally, use of a vision system in conjunction with a touch probe, including calibration of the system is challenging. Such challenges are intensified where the CMM employs multiple touch probes on a single moving arm.

SUMMARY OF THE INVENTION

This invention overcomes disadvantages of the prior art by providing a calibration fixture that enables more accurate calibration of a touch probe on, for example, a CMM, with respect to the camera so that hand-eye calibration process (described further below) can be undertaken with a direct view of the camera relative to a point being touched by the probe. The camera is mounted so that its optical axis is approximately or substantially parallel with the z-axis of the probe. The probe and workpiece are in relative motion, along (at least) a plane defined by orthogonal x and y axes, and optionally the z-axis and/or and rotation R about the z-axis. The calibration fixture is arranged to image from beneath the touch surface of the probe and, via a 180-degree prism structure, to transmit light from the probe touch point back along the optical axis to the camera. A collimating relay optics assembly can be located between a pair of right angle (90-degree) prisms that constitute the overall 180-degree prism assembly. The optical axis of the camera and probe touch surface are at a known orientation with respect to each other so that performing hand-eye calibration using the fixture allows camera's internal coordinates to be accurately mapped to the probe/CMM coordinate system. As such, during runtime, when camera identifies a workpiece feature within its field of view, the distance and orientation of the probe from this feature (based on the mapping) is accurately known and the probe can be translated/moved to the feature by moving the CMM a known distance along one or more axes.

More generally, this invention provides a system and method for accurately calibrating the offset between a camera and a probe, where the camera "views", and the probe "touches", a common plane. The probe can be of various types including electrical and mechanical. The common plane can, for example, be a circuit board, a semi-conductor die, or a touch display. The camera and probe are rigidly mounted together on a robot or stage (e.g. the CMM arrangement) so that they maintain a fixed offset as the robot or stage moves. The system and method includes a calibration fixture that incorporates a "touch-view surface" (TVS) and a "view port" (VP). The calibration fixture is adapted so that the displacement between the TVS and VP roughly matches the fixed displacement between the camera and the touch probe. The TVS includes a fiducial target (e.g., a metallic cross-hair plated onto the surface).

In another implementation, the system and method employs a first (fiducial-locating) camera mounted rigidly with respect to a moving robot or stage and a second (probe-locating) camera mounted with respect to a calibration fixture that combines an illuminator and a target, each of which optically communicate with a beam splitter. The probe-locating camera defines a (first) optical/camera axis aligned to view the target via a right-angle, beamsplitter mirror with the illumination beam passing through the mirror and the target so as to project an image of the target to the fiducial-locating camera along its (second) optical/camera axis. In operation, the probe-locating camera is used to determine the alignment of one or more probe tips with the fiducial and the fiducial-locating camera is used to locate the fiducial with respect to its pixels. In this manner offset from the fiducial-locating camera relative to each probe in the CMM coordinate system is determined and these offsets can be used during runtime to allow the camera to move the CMM arm (containing the probe(s)) to appropriate locations on an object under inspection.

In an illustrative embodiment, a vision system for guiding a touch probe is provided. The system includes a vision system camera assembly with a camera axis mounted with respect to a moving touch probe assembly with a longitudinal axis. A calibration fixture is provided, defining a prism assembly that bends an optical path by 180 degrees between parallel axes spaced at an offset spacing S. Illustratively, the offset spacing S is approximately the same as a spacing between the touch probe longitudinal axis and the camera axis so that the touch probe contacting the TVS is visible along the camera axis in the VP. The system can include a relay lens assembly within the fixture's optical path. Illustratively, the calibration fixture can include a field lens, typically located on the top surface of the VP prism, which allows the acquired image of the touch point to appear at the same focal distance as the touch surface and more generally reduces parallax errors and evens illumination across the camera field of view.

In illustrative embodiments, a field lens assembly can be located in the optical path on the prism assembly to reduce parallax generated by reflected light from the touch probe and balance illumination across a field of view of the camera assembly. Illustratively, the prism assembly has a first right-angle prism having a touch-view surface (TVS) that includes a fiducial thereon and a second right-angle prism having a viewing port (VP) for acquiring an image of the TVS. An illumination assembly can be provided, that transmits light into the first right-angle prism adjacent to the TVS, and the illumination assembly can have a beamsplitter located adjacent to an angled wall of the second right-angle prism to transmit light therethrough and through the relay lens assembly to the first right-angle prism. Alternatively, the beamsplitter can be located adjacent to an angled wall of the first right-angle prism to transmit light upwardly therethrough.

According to another alternative, the illumination assembly can be arranged to transmit light through an angled wall of the first right-angle prism so as to generate total internal reflection (TIR) within the first right-angle prism. In this arrangement, the illumination light thereby projects a glint in the VP at a location relative to the location on the TVS touched by the touch probe.

In a further illustrative embodiment, a method for calibrating a vision system in conjunction with a moving touch probe assembly is provided. A camera, having a camera axis, is oriented and mounted with respect to a longitudinal axis of the touch probe assembly. A prism assembly bends an optical path 180 degrees (in two separate 90-degree bends) between parallel axes spaced at an offset spacing S. The spacing S is approximately the same as a spacing between the touch probe longitudinal axis and the camera axis. The prism assembly defines a touch-view surface (TVS) with a fiducial thereon and a viewing port (VP) for acquiring an image of the TVS. The fiducial is touched with the probe to establish an alignment point, and the position of the probe is recorded by a touch probe motion controller as POSITION-PROBEALIGNED. The touch probe and the rigidly attached camera are then translated by the motion controller so that the camera is aligned to view the fiducial over the TVS and the position of the touch probe is recorded as POSITIONCAMERAALIGNED. The offset spacing is then computed as difference between POSITIONCAMERAA-LIGNED and POSITIONPROBEALIGNED. Illustratively, the computed offset spacing at runtime is used to move the probe to a position of a workpiece based upon a feature identified on the workpiece by the camera.

In another illustrative embodiment, and illustrative vision system and method for guiding a touch probe assembly using two vision system cameras is provided. A calibration fixture is provided. The fixture includes the fiducial, which is arranged to allow selective contact with the touch probe based upon movement between the touch probe assembly and the fixture. The calibration fixture includes a beamsplitter that allows both illumination light to pass from a source through the fiducial and a first optical path that is turned through an angle for viewing through the fiducial into a space thereabove, which selectively contains the touch probe assembly. A first vision system camera assembly is located with respect to the beamsplitter, and defines a first camera axis located along the first optical path. A second vision system camera assembly, with a second camera axis is mounted rigidly with respect to the touch probe assembly, and selectively views the fiducial as illuminated by the source. The arrangement can illustratively include a plurality of touch probe assemblies each selectively movable with respect to the fixture to each selectively contact the fiducial. Each of the touch probe assemblies is rigidly attached with respect to the second camera assembly. Illustratively, a field lens assembly can be located in the first optical path to reduce parallax generated by reflected light from the touch probe and balance illumination across a field of view of the camera assembly. In an exemplary implementation, the touch probe assembly is located on a moving arm of a coordinate measuring machine (CMM), and the CMM includes a controller that tracks motion of the arm. Each of the first vision system camera and the second vision system camera provide feedback for recording a position of the arm based upon the controller when, respectively, the touch probe contacts the fiducial and the second camera axis is aligned with the fiducial. In this manner relative offsets between each touch probe assembly and the second vision system camera axis can be computed for use in runtime operations.

In another illustrative embodiment, the vision system for calibrating a touch probe assembly can be integrated in a single unit that includes a mounting base, a camera and an optics block with a reticle, field lens, beam splitter, aspherical lens assembly and illumination source. The camera receives light from the TVS, which is located at the reticle and is reflected through a right angle at the reflective surface of the beam splitter. The illumination source is projected axially through the reflective surface and reticle onto the probe. The optics block is covered by a housing cover that also covers at least part of the lens-end of the camera assembly to prevent light leakage and resist infiltration of environmental contaminants.

Illustratively, the beamsplitter and the illumination light are mounted in the optics block with respect to a mounting base that supports the second vision system camera; and the optics block has a reticle adapted to contact the touch probe. The reticle generally defines a fiducial pattern, and a light-conditioning lens between the illumination light and the beamsplitter. The light-conditioning lens can comprise an aspheric lens assembly with a concave and a convex lens pair. A field lens is illustratively located between the reticle and the beamsplitter. A housing cover is illustratively mounted over the optics block and at least a portion of the second vision system camera. The light source can include a circuit board with an LED assembly mounted thereon. The circuit board can be mounted on an end of the optics block opposite an end of the optics block on which the reticle is mounted.

In a further illustrative embodiment, an integrated calibration arrangement for calibrating a first vision system camera is provided. The arrangement guides a moving touch probe with respect to a workpiece. The arrangement comprises a base that mounts a second vision system camera and an optics block with a fiducial pattern on an illuminated reticle. The reticle is adapted to selectively contact the touch probe and is also selectively viewed by the first vision system camera. A beam splitter is located in the optical block, which merges an optical path of a source that illuminates the reticle with an optical path of the second vision system camera. In this manner the first vision system camera can locate the viewed reticle in the coordinate space of the touch probe assembly; and the second vision system camera can view the touch probe as it is aligned with the reticle. These two alignments can be coordinated by a processor to calibrate the touch probe with respect to the field of view of the first vision system camera.

In another embodiment, a vision system camera assembly is provided, with a camera axis mounted with respect to a moving touch probe assembly with a longitudinal axis. A calibration fixture defining a prism assembly bends an optical path by 180 degrees between parallel axes spaced at an offset spacing S, the spacing S being approximately the same as a spacing between the longitudinal axis and the camera axis. An illumination assembly directs illumination into a first prism in the prism assembly through a first face. The first prism includes a top face that confronts a tip of the touch probe assembly. The illumination is reflected twice by total internal reflection and exits the first prism through the first face. The first prism is constructed and arranged so that, when the tip contacts the top face, or resides within a few wavelengths of light above the top face, total internal reflection is frustrated and an evanescent wave couples with the tip, whereby light leaks through the top surface. The leaked light thereby scatters from the tip and reenters the first prism at a near normal (90-degree) angle of incidence to travel through the vision system camera assembly from a contact point of the tip. This allows for relatively precise location of the contact point without (free-of) actually contacting the probe to the prism surface.

BRIEF DESCRIPTION OF THE DRAWINGS

The invention description below refers to the accompanying drawings, of which.

DETAILED DESCRIPTION

Figure 1:
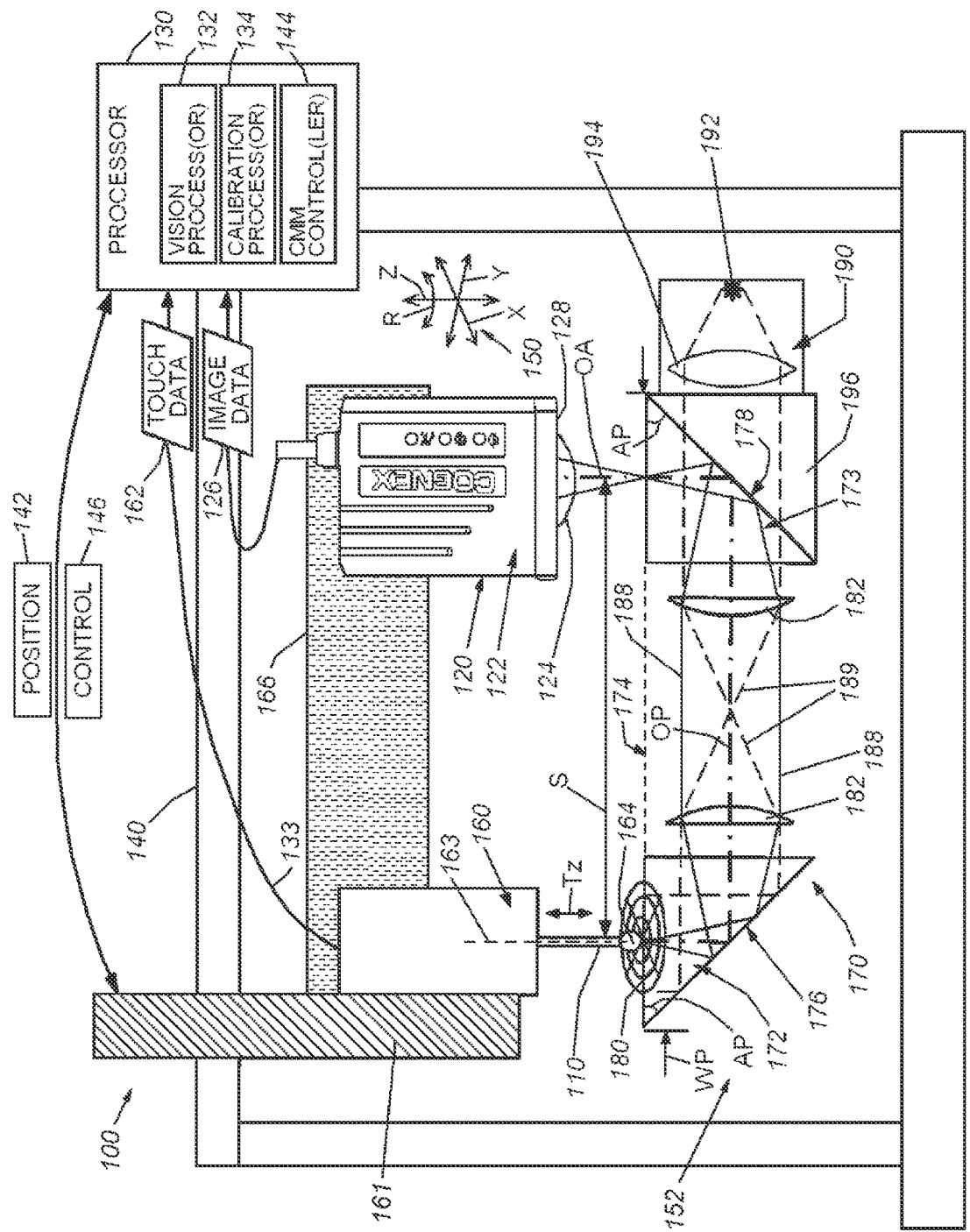
FIG. 1 is a diagram of a calibration fixture arranged in conjunction with a coordinate measuring machine (CMM) touch probe assembly and associated vision system camera according to an illustrative embodiment.

FIG. 1 details a generalized overview of a manufacturing or inspection arrangement 100. This arrangement can be used for a variety of manufacturing and/or quality control purposes involving workpieces (also termed herein "objects") that are inspected using a CMM touch probe 110 or similar device. The depicted arrangement 100 includes a vision system 120 having a camera assembly 122 with a lens 124 (shown in phantom) arranged along an optical axis OA. An illumination assembly can be contained in a front face 128 on the camera body, generally to provide illumination to the surface of a workpiece during runtime. As described below, an additional illumination assembly can be located below the target, injecting light through a beamsplitter prism that is part of the arrangement's calibration fixture (170, described below). The camera 122 includes an imager (not shown) that generates image data 126. The image data 126 is transmitted via a wired, wireless and/or internal link 133 to a processor assembly 130 with an associated vision processor 132 that can reside internal to the camera body or entirely (or partially) remote from the camera 122. In a remote arrangement, the processor assembly 130 can be contained within a general purpose, or dedicated, computing device, such as a PC, laptop, tablet or smartphone. Where the camera 122 conducts on-board image processing, the results of processing can be transmitted as data to another remote processor or device for use in CMM motion control processes (as well as other vision based processes, such as alignment and/or inspection) as described further below. The vision processor 132 typically includes associated vision processes, such as pattern recognition and/or search tools that can be sourced from a variety of vendors, such as Cognex Corporation of Natick, Mass.

Note, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software.

The processor 130 also includes a calibration process/processor 134 and associated tools/applications. As described further below, these tools are employed to perform various calibration functions within the vision system. In general, these functions include hand-eye calibration of the vision system coordinate system to that of the workpiece and/or the CMM to be described further below. By way of further background, for machine vision hand-eye calibration, a calibration fixture and associated calibration fiducial is typically moved to a plurality of predetermined poses at which cameras acquire respective images of the fiducial. The goal of such hand-eye calibration is to determine the rigid body poses of the camera(s) and calibration fixture (containing at least one calibration fiducial) in the "motion coordinate system". The motion coordinate system can be defined in a variety of ways. The numbers in the poses (that specify where fiducial and/or cameras reside in the space) should be interpreted in an appropriate coordinate system. Once a single unified coordinate system is selected, the poses and motion are described/interpreted in that global coordinate system. This selected coordinate system is often termed the "motion coordinate system." Typically "motion" is provided by a physical device (for example, the CMM as described below) that can render physical motion, such as a robot arm, or a motion stage, such as a gantry. Note that either the calibration fixture/fiducial can move relative to one or more stationary camera(s) or the camera(s) can move relative to a calibration fixture/fiducial. The controller of such a motion-rendering device employs numerical values (i.e. poses) to command the devices to render any desired motion, and those values are interpreted in a native coordinate system for that device. Note, although any motion coordinate system can be selected to provide a common, global coordinate system relative to the motion-rendering device and camera(s), it is often desirable to select the motion-rendering device's native coordinate system (e.g. its x and y axes) as the overall motion coordinate system. Hand-eye calibration, thus, calibrates the system to a single motion coordinate system by rendering of motions (either moving the calibration fiducial or moving the cameras), and acquiring images before and after that motion to determine the effects of such motion on a moving object. When the vision system employs hand-eye calibration, its calibration process solves poses by correlating the observed motion effect in the images with the commanded motion (for which the commanded motion data is known). Another result of the calibration is a mapping between each pixel position in a camera's image and a physical position in the motion coordinate system, so that after finding a position in the imaged scene (also termed the image space or, herein the inspection volume space), the position in the motion coordinate system can be translated and the motion-rendering device (CMM) can be commanded to act upon it.

As shown in FIG. 1, the arrangement 100 includes a CMM 140, which provides motion along x, y, z and at least one rotational axis R (about the z-axis) as depicted y the coordinate system arrows 150. The structure of the CMM is highly variable. In various well-known implementations it consists of an arm assembly (not detailed) that overlies an inspection area, within the inspection volume space 152. The inspection area is a solid, vibration-free surface that receives workpieces, typically in a fixture. Linear actuators move the arm through the above-described x, y, z and R orientations. The motion/position of each linear actuator is tracked by an encoder or other motion-measuring device. This motion/position data 142 is transmitted to the processor 130 (or another processor/computer) and can be processed by a CMM control process/processor 144 that also guides the CMM based on feedback from the position data 142 and inputs of the vision system using control information 146.

The CMM guides a touch probe 110 that is mounted on a moving probe base 160. The touch probe and base are highly sensitive to contact along (at least) the z-axis direction, and any displacement Tz results in generation of a touch signal 162 that is transmitted to the processor 130 for use by the vision system and the CMM motion controller 144. That is, as the touch probe is moved around a workpiece, it is brought into contact, typically along the z-direction, with the workpiece surface. The coordinates of where the touch point 164 contacts the surface are controlled and recorded. In this example, the touch point is defined by a polished metal sphere that presents a specular surface, the use of which is described further below. One example of a runtime operation using a touch probe is in testing a touch screen to ensure that touching various screen coordinates translate into expected inputs for those coordinates.

The vision system camera 122 is illustratively fixed (represented by bar 166) with respect to the CMM probe holder 160 and arm 161, and thereby maintains a known focal distance with respect to the inspection area 152. That is, the camera moves in the z-direction along its optical axis OA under motion of the arm 161 to the same extent as the probe itself (which moves in the z-direction along its associated longitudinal axis (dashed line 163). The specific mounting system for retaining the camera relative to the CMM is highly variable. In general, the camera is mounted so that it moves relative to the probe holder 160 and arm 161, while maintaining a known offset spacing, and an optical axis OA that is substantially parallel to the z-direction. Thus, as the probe is moved about the inspection area, the camera follows its motion at a precise and constant spacing/offset S. In an embodiment, the spacing/offset S of the camera axis OA from the probe's longitudinal axis 163 is approximately 20-60 millimeters along the x and/or y axis of CMM motion. However the spacing and position of the camera axis relative to the probe is highly variable in other embodiments.

In an illustrative embodiment, the arrangement 100 employs a calibration fixture assembly 170 to map the vision system camera field of view to the touch point 164 of the touch probe 110 and associated CMM coordinate system. The goal is to ensure that when the camera locates a feature on a workpiece (e.g. a fiducial, edge, corner, etc.) that the CMM touch probe 110 can be guided accurately relative to the feature. Thus, the vision system processor determines the pose of the workpiece, and establishes the workpiece's coordinates within the CMM motion controller coordinate system. The fixture assembly 170 includes a pair of right angled prisms 172 and 173 oriented to oppose each other as shown, collectively defining a top surface plane 174 that extends an overall width WP that is generally greater that the probe-to-camera-axis spacing/offset S. The prisms 172 and 173 each include respective, oppositely angled walls 176 and 178, each extending inwardly at an equal and opposite angle AP of 45 degrees. These walls 176, 178 each bend the optical path OP through the prism by approximately 90 degrees so that overall, the path OP travels across the spacing/offset S within the prism as shown. In this manner, the touch point 164 of the probe 110 appears along the optical axis OA of the camera 122.

The top surface plane 174 defined by the prisms 172, 173 includes a target or fiducial 180 in illustrative embodiments. The fiducial 180 is located on the top of the depicted (e.g. left) prism 172 and can be defined herein as a "touch-view surface" (TVS). Light from the fiducial 180 is transmitted as shown along the optical path OP through the overall fixture 170 to the depicted (e.g. right) prism 173 through a top surface that can be defined as a "view port" (VP). The fiducial can be applied to the top of the prism 172 using a variety of techniques—for example metal deposition, screen-printing, and/or etching. Any acceptable fiducial pattern/design, such as the depicted concentric circles with a cross can be implemented. The fiducial 180 is visible to the camera through the prism assembly 172, 173 generally when the probe overlies the fiducial and assists in orienting the arrangement. Notably, the prism assembly 172, 173 also includes a pair of relay lenses 182 that make the image rays 188 parallel (collimated) between the two prisms. The power and shape of the relay optics/lens assembly 182 is highly variable, and the design thereof should be clear to those of skill in optics. In an embodiment, the relay optics is arranged as telecentric lenses. Note also that the imaging rays 188 are depicted as solid lines, while illumination rays 189 (described below) are depicted as dashed lines in the depiction of FIG. 1, et seq.

The fixture assembly 170 includes an integrated illumination assembly 190, consisting of an illumination source (e.g. an LED unit 192) and a condensing lens 194. The illumination assembly 190 is located in line with the optical path OP, behind a beamsplitter 196, typically of conventional design. The beamsplitter 196 allows the illumination light to pass directly through the angled wall 178 of the prism 173 as shown (across, and perpendicular to, the camera optical axis OA) while enabling the image rays to bend 90 degrees onto the optical axis OA). The illumination light rays 189 pass from the beamsplitter 196 through the collimating relay optics 182, and into a 90-degree bend at the wall 176 of the prism 172. The light then projects out the prism top, through the fiducial 180. In the depicted arrangement 100 of FIG. 1, the camera views, through the view port, an illuminated touch point 164 and the illuminated fiducial pattern (180).

Note that the fixture assembly 170 is shown without an accompanying framework for clarity. Any acceptable framework or housing can be employed to rigidly retain the prisms 172, 173, relay optics 182, illumination assembly 190, and other elements (e.g. field lens described below) in an integral unit. The fixture, and its associated housing or framework, can be adapted for selective placement in, and removal from, the inspection volume space 152 of the CMM as a temporarily attached (removable) calibrator that is typically present in the inspection volume space only during calibration procedures. Alternatively, the fixture framework/housing can be permanently mounted at a position below (e.g.) the inspection area in which a workpiece is removably located. In a permanently-mounted, it can either be built into the stage that holds the workpiece, or it can reside below the stage. The z-direction elevation of the fixture 170 in the space 152 can be widely varied since, when the probe is moved an appropriate z-axis distance to touch the top surface plane 174, the rigidly attached camera is automatically positioned at a known focal distance from the top surface 174. That is, the camera moves up and down in synchronization with the probe.

Figure 2:
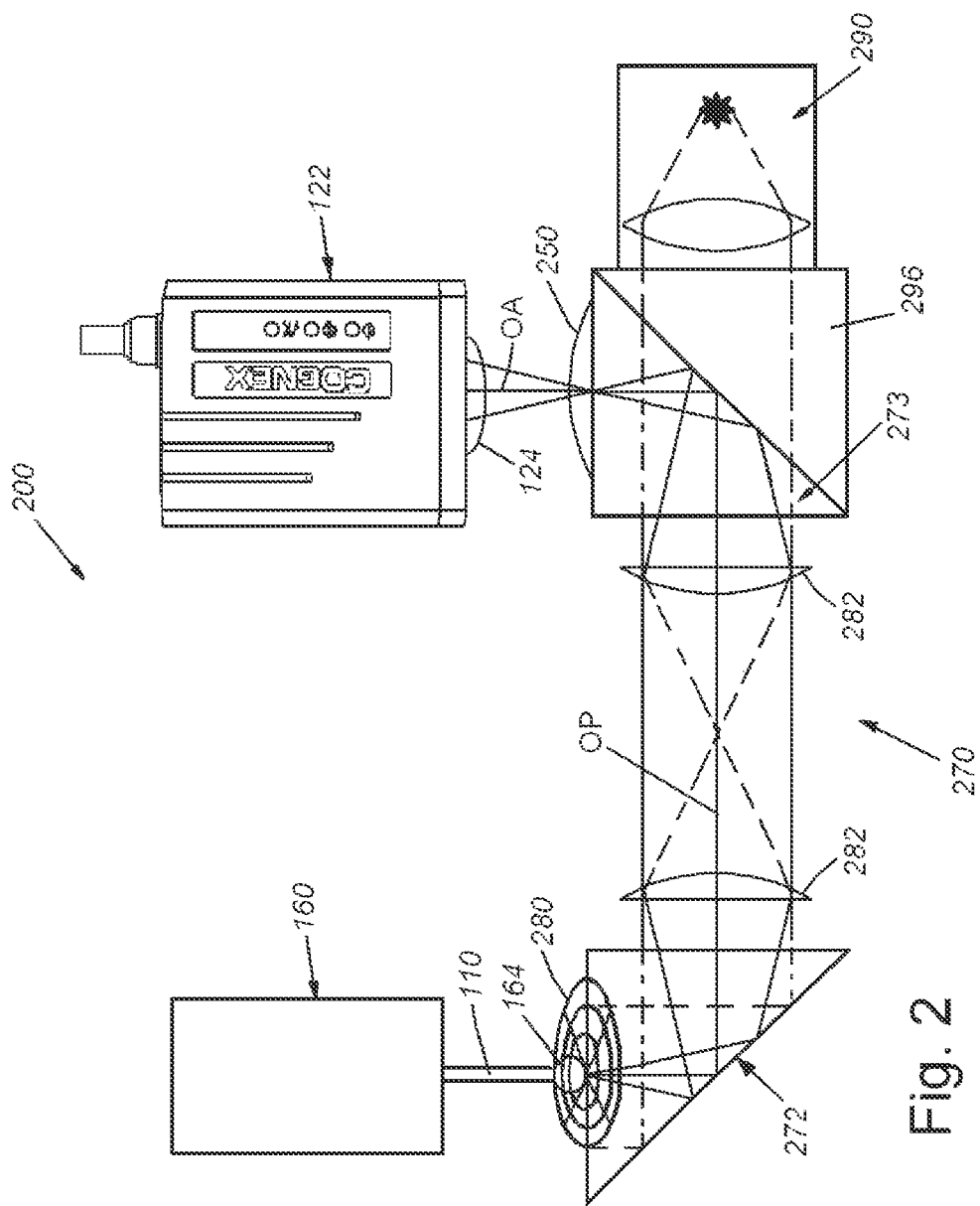
FIG. 2 is a diagram of a calibration fixture according to an alternate embodiment that includes a field lens, arranged in conjunction with the CMM touch probe assembly and associated vision system camera of FIG. 1.

FIG. 2 shows an arrangement 200 with an alternate embodiment of a calibration fixture 270, having right-angle prisms 272, 273, relay lenses 282 and a fiducial 280 on the TVS prism 272, arranged as described above (see FIG. 1). The illumination assembly 290 is also arranged with respect to a beamsplitter 296 in line with the VP prism 272 as described above (see FIG. 1). Notably, the top surface of the VP prism 273 includes a field lens 250 that serves a plurality of purposes. The field lens 250 generates a brighter and improved illumination pattern across the entire camera field of view (in the manner of a Fresnel lens), and more generally causes the camera lens 124 to behave like a telecentric lens. The field lens also reduces (compensates for) parallax error cause by the spherical geometry of the probe, in which a reflected "glint" of light actually appears above the top surface of the TVS prism 272 without the lens 250. Conversely, the field lens 250 moves the glint to the plane (174 in FIG. 1) of the top surface. In general, the field lens 250 places the focus of the image at the entrance pupil of the camera 122.

It is contemplated that the above-described field lens (250) can be fitted to any of the fixture embodiments shown and described herein. The field lens is omitted from depicted embodiments to enhance clarity of the overall description thereof.

Figure 3:
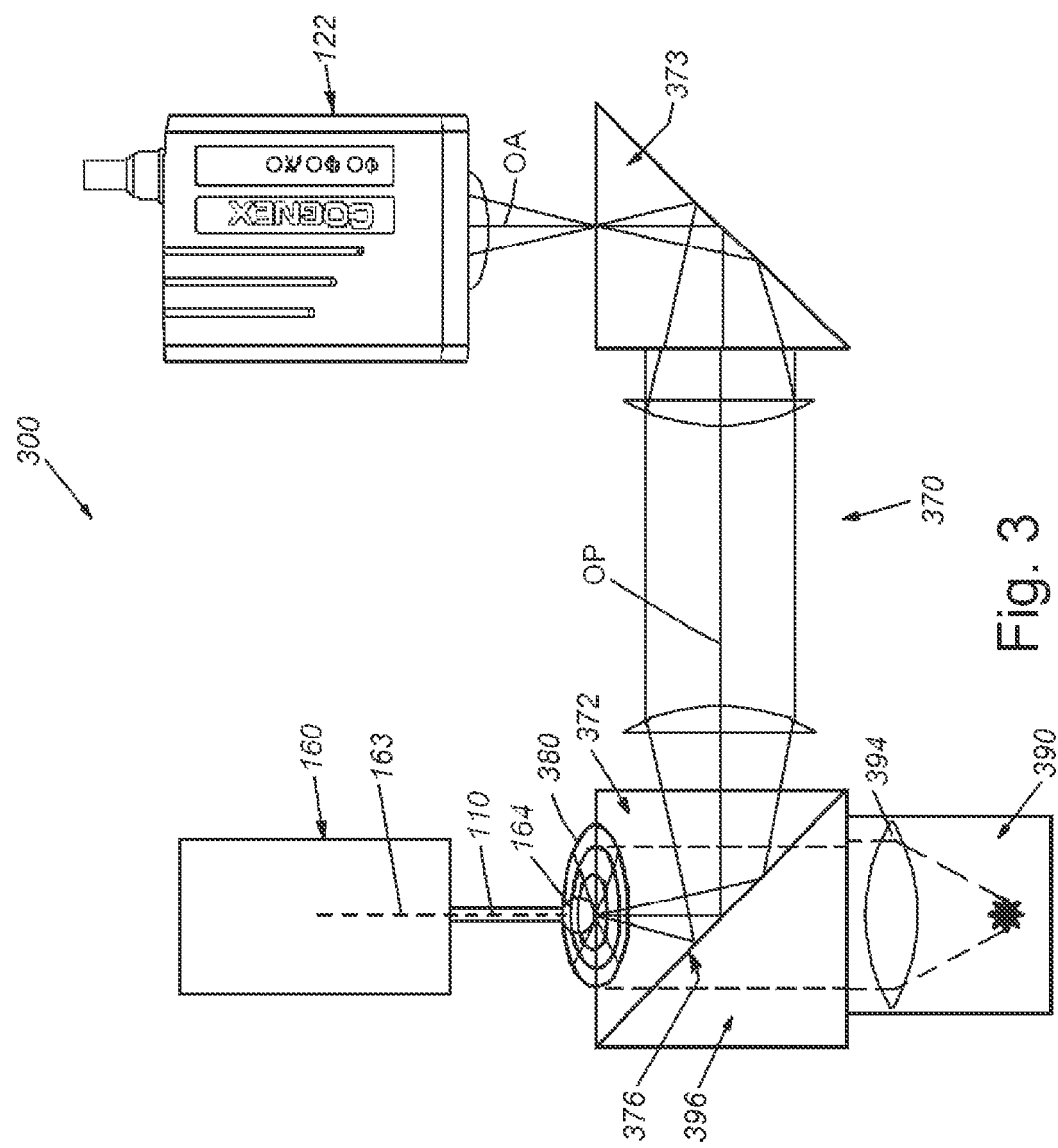
FIG. 3 is a diagram of a calibration fixture according to another alternate embodiment that includes an illumination beamsplitter aligned beneath the fixture fiducial, arranged in conjunction with the CMM touch probe assembly and associated vision system camera of FIG. 1.

With reference to FIG. 3, the arrangement 300 shows another alternate embodiment of a calibration fixture 370, having right-angle prisms 372, 373, relay lenses 382 and a fiducial 380 on the TVS prism 327, arranged as described above (see FIG. 1). In this embodiment, the illumination assembly 390 is arranged with respect to a beamsplitter 396 mounted in line with the TVS prism 372. The illumination rays project directly upward, passing through the angled wall 376 along the longitudinal axis of the probe 110. In this and other embodiments, the condensing lens 394 of the illumination assembly 390 spreads the beam to effectively cover the fiducial 380 in the manner of a telecentric lens. Thus, the illumination rays in this embodiment do not travel along the relay optics.

Figure 4:
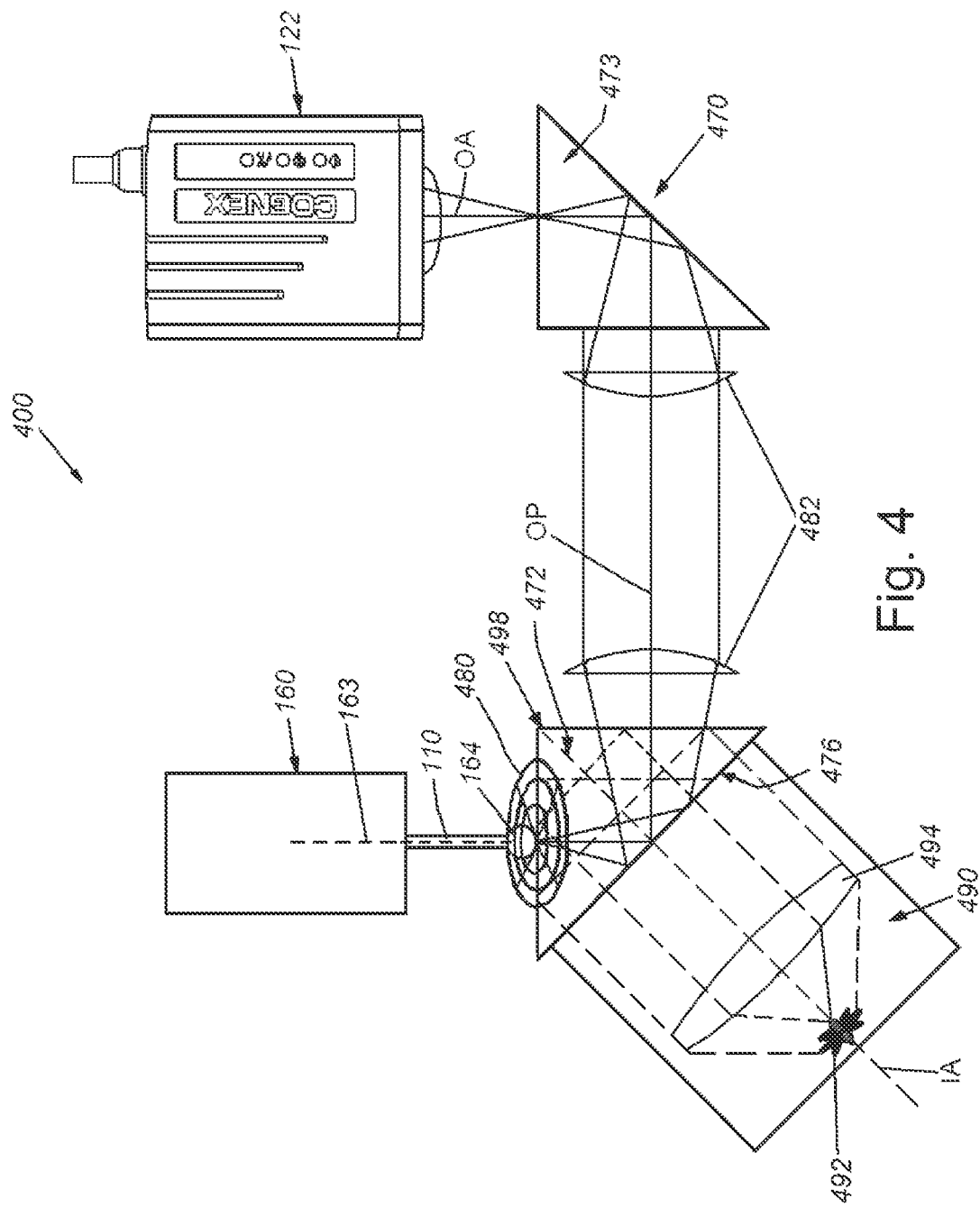
FIG. 4 is a diagram of calibration fixture according to another alternate embodiment that includes an evanescent coupling to provide frustrated total internal reflection (TIR), arranged in conjunction with the CMM touch probe assembly and associated vision system camera of FIG. 1.

FIG. 4 shows an arrangement 400 with yet another alternate embodiment of a calibration fixture 470, having right-angle prisms 472, 473, relay lenses 482 and a fiducial 480 on the TVS prism 472, arranged as described above (see FIG. 1). The illumination assembly 490 is arranged with a condensing lens 494 having an axis IA perpendicular to the angled TVS prism wall 476. The axis IA is thereby defined to extend through the illumination source 492 and through the opposing right-angle corner 498 of the prism 472. The illumination rays, thus, are transmitted directly into the prism 472, free of a beamsplitter, and are oriented as shown to experience total internal reflection (TIR) within the prism. Notably, this illumination arrangement results in an effect defined as evanescent-coupling frustrated TIR when the tip of the probe touch point 164 contacts the top surface of the prism 472. This contact results in a high-contrast glint or flash at the viewing port (VP) in the opposing prism 473. Such a high contrast point in the acquired image advantageously facilitates the calibration process by eliminating potential background noise that can render location of the probe less accurate.

Figure 5:
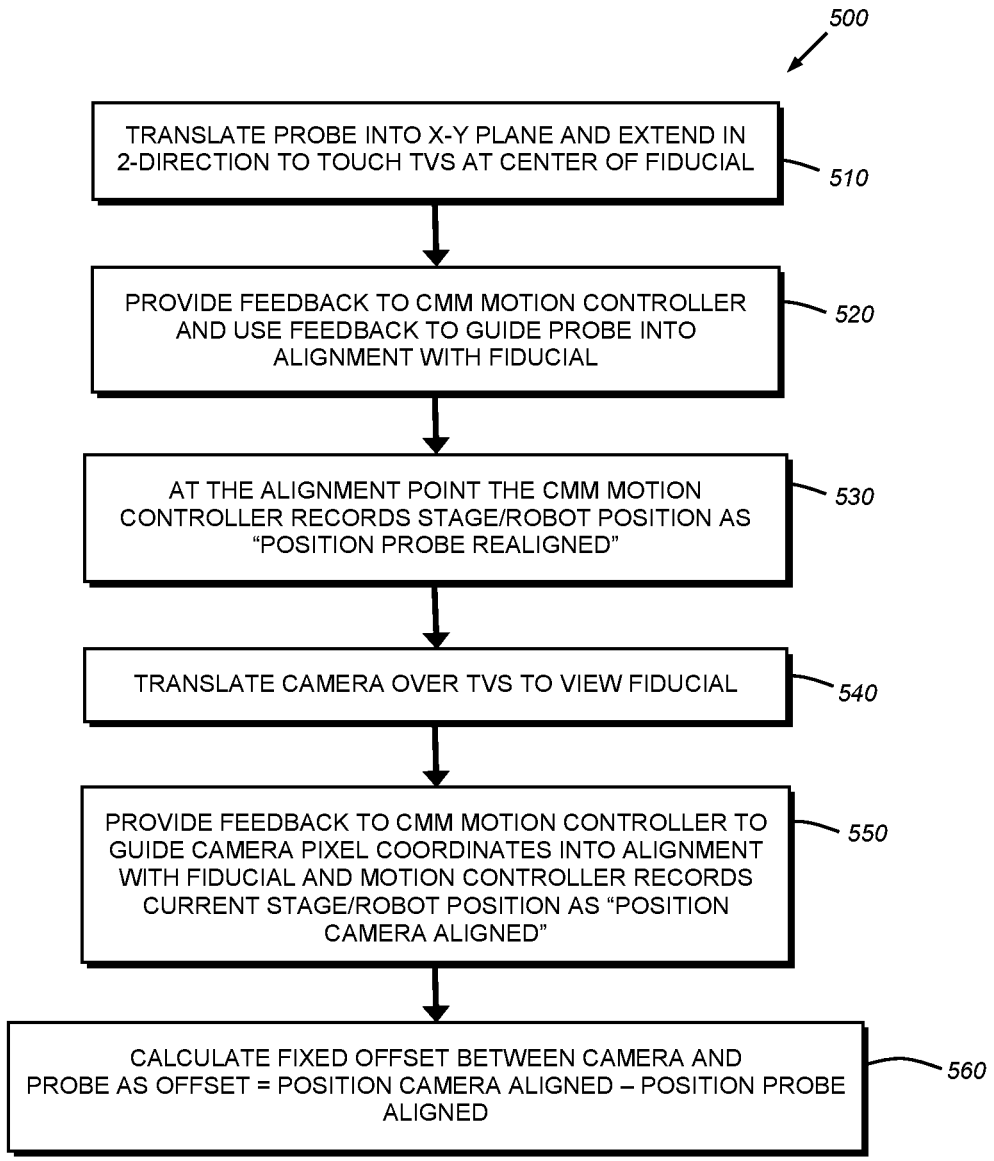
FIG. 5 is a flow diagram of a calibration process according to an illustrative embodiment using the fixture of any of the calibration fixture embodiments of FIGS. 1-4.

Reference is now made to FIG. 5, which describes a generalized calibration process 500 using the calibration fixture according to any of the embodiments described herein. In step 510, the probe is translated (in the x-y plane) and extended (along the z axis) to touch the TVS surface at the center of the fiducial. As part of the probe-to-fiducial alignment process, the camera looks through the VP in the calibration fixture to see an in-focus bottom view of the probe. Then, in step 520, the camera provides feedback to the CMM motion controller to guide the probe into alignment with the fiducial.

In step 530, when the fiducial is aligned with the center of the fiducial cross-hair on the TVS, the CMM motion controller records the current stage/robot position. This is defined as the data value PositionProbeAligned. Optionally, the camera/vision system can record coordinates of pixels at the alignment point.

Then, in step 540, the camera is translated by the CMM motion controller to bring the camera over the TVS. The camera now directly views the fiducial cross-hair and (in step 550) provides feedback to the motion controller to guide the camera pixel coordinate recorded in the previous step 530 into alignment with the fiducial. The CMM motion controller then records the current stage/robot position in a data value defined as PositionCameraAligned. Note that any desired reference point in the image (e.g. the image center) can be aligned to the center of the TVS fiducial. This reference point in the camera coordinate system then becomes the origin with respect to which runtime displacements of found features on a workpiece are later reported.

In step 560, the process 500 then calculates the fixed offset (spacing) between the camera and probe as Offset=PositionCameraAligned−PositionProbeAligned. This computation completes the calibration process 500. The fixed offset estimated during calibration is stored in the processor 130, and can subsequently be used by a runtime alignment application where the camera guides the probe to contact specific locations on the surface of parts whose location is registered by the camera.

Figure 6:
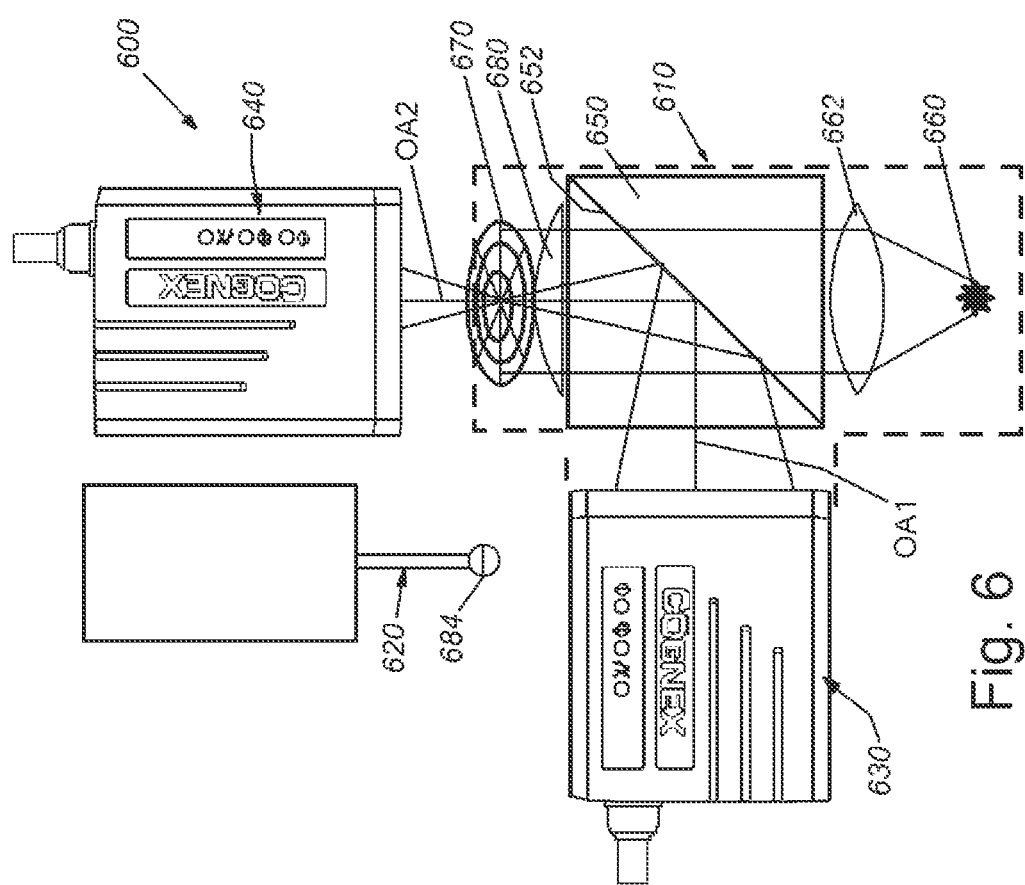
FIG. 6 is a diagram of a calibration fixture arrangement according to another alternate embodiment that includes a first vision system camera arranged to view the fiducial and the touch probe through a fixture beamsplitter mirror through which an illumination source is projected to illuminate the fiducial and a second vision system camera mounted in a rigid relationship with a CMM touch probe, shown viewing the fixture fiducial.

Reference is now made to FIGS. 6-9, which depict an arrangement 600 according to an alternate embodiment, of a calibration fixture (dashed box 610) and associated CMM touch probe assembly 620. In this arrangement 600, a pair of vision system cameras 630 and 640 are employed to effect calibration of one or more touch probes, rigidly attached at a defined spacing on a CMM arm assembly (described below). This fixture 610 omits a separate VP relative to the TVS, and the associated optics that effect this arrangement. With particular reference to FIG. 6, the arrangement 600 includes a beamsplitter 650 similar in structure and function to those described above (referencing FIGS. 1-4). The beam splitter turns the optical/camera axis OA1 at a right angle as shown based upon a mirror surface 652. This allows the first camera (also termed the probe-locating camera) 630 to be mounted beneath the TVS as shown at a right angle with respect to the z-axis of the probe/CMM. The beamsplitter 650 allows transmission of an illumination light source (e.g. an LED assembly or other source, as described above) 660 along the optical axis OA2 (aligned with the z-axis) through the fiducial 670 (located on the TVS plane) to the second camera (also termed the fiducial-locating camera) 640. A condensing lens 662 of conventional design and function can be positioned in front of the illumination source 660 to spread and/or collimate the light so it covers the fiducial more evenly in the manner of a telecentric lens arrangement. The second camera 640 is mounted similarly to the single camera described above (referencing FIGS. 1-4). Its optical axis OA2 is aligned vertically/along the z-axis as shown. The fixture 610 can include a field lens 680 along the optical path (e.g. between the beamsplitter 650 and fiducial 670), which is arranged, and functions, similarly to those described above with reference to FIGS. 1-4. This lens 670 particularly compensates for any z-axis offset in the visible "glint" (sudden reflection) viewed from the ball 684 of the touch probe assembly 620 relative to the TVS plane.

Figure 7:
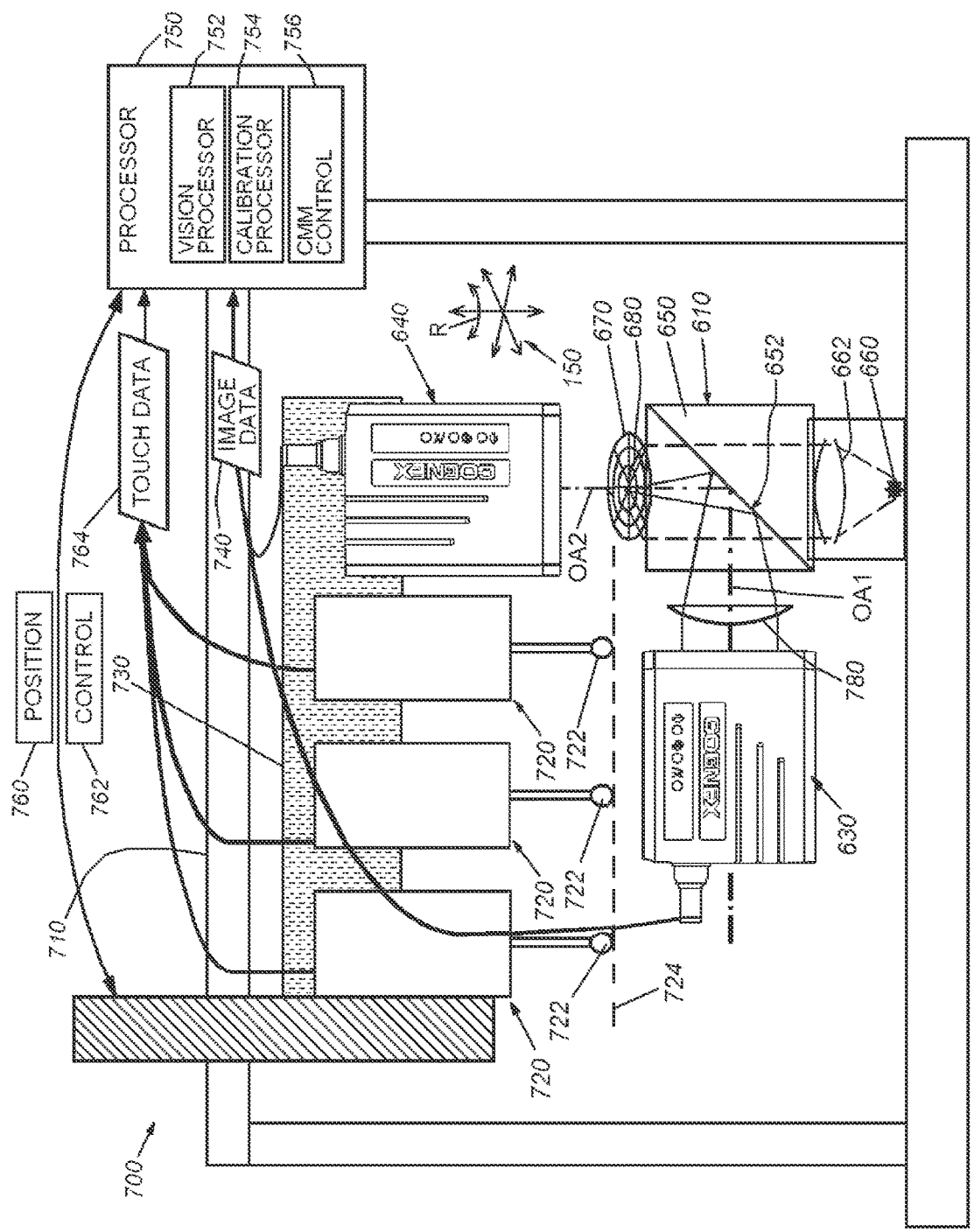
FIG. 7 is a diagram of the calibration fixture of FIG. 6 arranged with respect to a CMM touch probe assembly, including multiple touch probes as an option.

With reference to FIG. 7, the overall arrangement 700 of the CMM 710 with touch probe assembly 720 and two-camera the calibration fixture arrangement 610 is shown. The relative motion coordinate system 150 (x, y, z and R) of the CMM 710 is shown and similar to that described above. The (optional) multiple probe arrangement consists in this example of three individual touch probe assemblies, each with a touch probe ball (or other tip) 722 residing in a common plane (dashed line 724). The particular orientation of probes relative to x and y is highly variable, as is the total number of probes (from 1 to N). The probes are all rigidly attached (in x, y and R) with respect to each other on the moving CMM arm 730 as shown. Likewise, the second, fiducial-locating camera 640 is rigidly attached on the arm 730. Thus, the probes and camera are in a fixed orientation with respect to each other and the goal of calibration is to reference each probe and the camera axis OA2 relative to the CMM motion coordinate system. This is accomplished using the fixture 610, which can be permanently or temporarily mounted within the CMM 710. Each camera 630, 640 communicates image data 740 to the processor 750. This processor, like the processor 130 above, can be implemented in whole or in part as a standalone computing device (e.g. a PC, laptop, tablet, smartphone server or, purpose-built processing circuit. Alternatively some or all of the processing (e.g. image processing) can be performed within the housing of one or both camera(s). For example, so-called "smart" cameras, such as the In-Sight® series from Cognex Corporation, can perform image processing and vision system tasks within the housing of the camera assembly, delivering processed image data to a remote device. As described above, the processor assembly 750 includes one or more vision processor(s) 752 and associated calibration processor(s) 754. The processor assembly 750 is integrated with, or communicates with a CMM control processor/ process 756 as described above. CMM arm position data 760 and arm control data 762 are transferred between the manipulator(s) of the CMM arm 730 and the processor 750 via the CMM control 756. Touch data 764 from each prove assembly 720 is also transmitted to the processor assembly 750 to indicate when the probe has contacted (via z-axis motion) the TVS (or runtime object) surface. In this exemplary embodiment an additional lens 780 is provided between the probe-locating camera 630 and the beamsplitter 650. This lens corrects for focal distance so the camera 630 can be placed in an appropriate arrangement with respect to the fixture 610.

The calibration of probes with respect to the CMM coordinate system is similar to that employed in FIGS. 1-4 except that the data of each camera 630, 640 is used as appropriate for each respective stage of the process—i.e. probe location and fiducial location. Thus, with reference to FIG. 8, one of the probe assemblies (in this example part of a four-probe arrangement) 820 is located so that its touch ball/tip 822 is aligned with the fiducial. The optical/camera axis OA 2 of the fiducial-locating camera 640 has moved away from the fiducial, and the probe-locating camera 630 views alignment between the probe ball/tip 822 and the fiducial 670, based upon a reflected glint or other indication. Note that any of the above-described physical effects (e.g. frustrated TIR etc.) or arrangements of illuminator and beamsplitter can be employed with respect to the contemplated two-camera calibration arrangement in alternate embodiments. As the tip 822 each probe assembly 820 is moved into alignment with the fiducial 670, the relative position of the CMM arm is recorded at the processor assembly 850 and the overall relationship of probes within the (e.g. x, y, R) motion coordinate system and with respect to the fiducial-locating camera axis (OA2) is determined.

Figure 8:
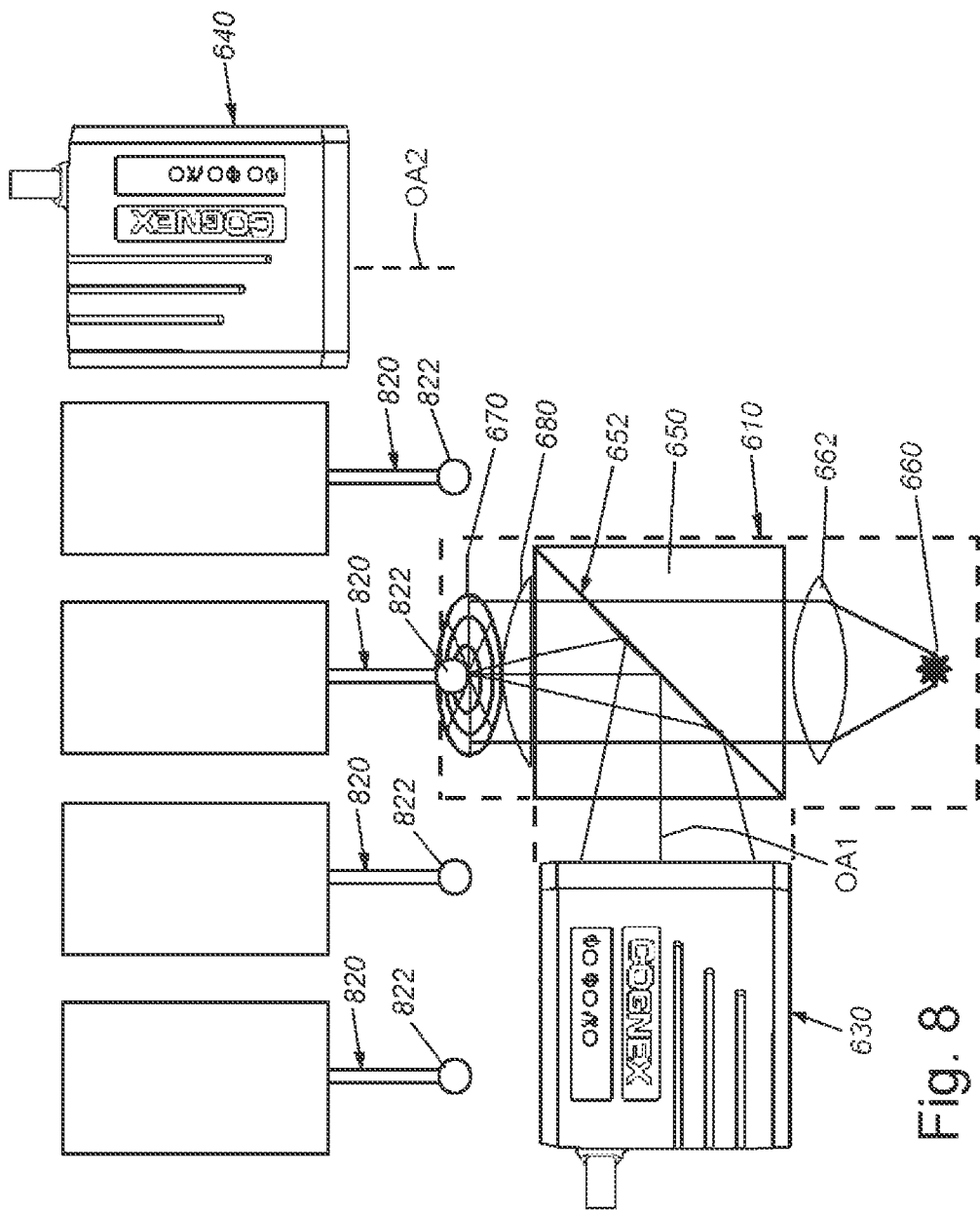
FIG. 8 is a diagram of the arrangement of FIG. 7 showing one of the touch probes in alignment with the fiducial in which the first vision system camera views the alignment of the probe with the fiducial.

The two-camera arrangement of FIGS. 6-8 above is particularly advantageous for use in calibrating the relative position of multiple probes. This is due to the ease with which each probe (in a multiple arrangement) can be visually located, in turn, by the operator (or automated process) when aligned with the fiducial 670 using the probe-locating camera 630.

Figure 9:
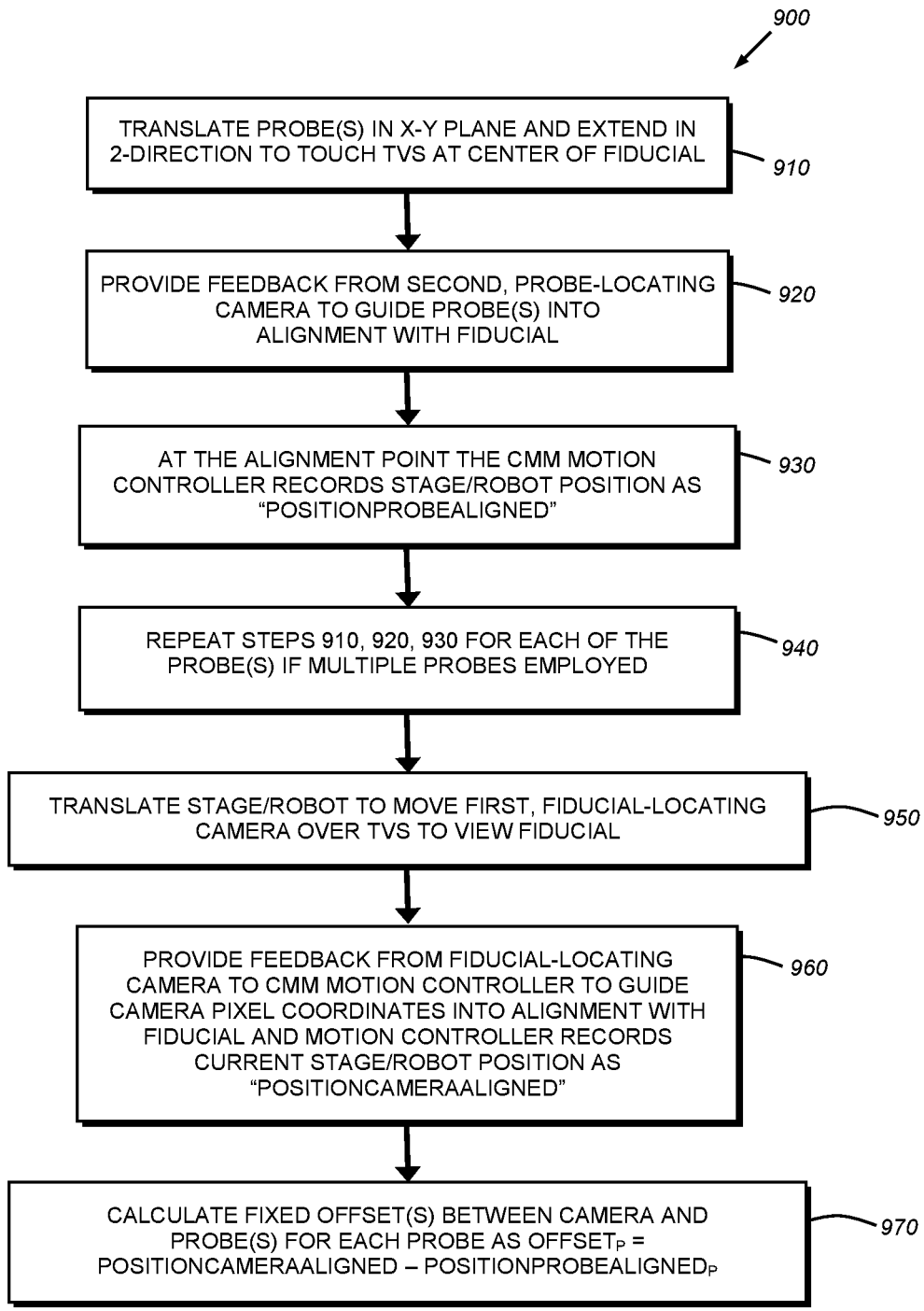
FIG. 9 is a flow diagram of a calibration process according to another illustrative embodiment using the fixture of the calibration fixture embodiment of FIGS. 6-8.

With reference to FIG. 9, a procedure 900 for calibrating one or more probes with respect to the fiducial-locating camera axis and CMM coordinate system is shown and described. In step 910, the probe is translated in the x-axis and y-axis (and optionally R-rotation) directions along the associated x-y plane, and extended when appropriate in the z-axis direction to touch the TVS in the region of the fiducial. The touch is sensed by the processor as z-axis motion triggers an appropriate switch in the prove assembly (as described above). Visual feedback provided by the probe-locating camera is used in step 920 to guide the ball/tip of the probe assembly (as it touches or is proximate to the TVS) into alignment with the fiducial center (e.g. a crosshair or other indicia). In step 930, the CMM motion controller records the arm (or stage/robot) position at the alignment point as a variable PositionProbeAligned$_P$, where P is the number of the particular probe aligned in an assembly of probes 1-N. In step 940, above-described probe-alignment steps 910, 920 and 930 are repeated for each probe 1-N. An appropriate value for PositionProbeAligned$_1$ to PositionProbeAligned$_N$ is determined and recorded.

In step 950 of the procedure, the arm (stage/robot) is then translated to move the fiducial-locating camera and associated axis over the TVS to view the fiducial. Feedback from the fiducial-locating camera is used in step 960 to guide the CMM arm (stage/robot) so that the pixels of the camera are aligned appropriately with the fiducial. The current position of the arm (stage/robot) is ten recorded by the processor assembly and motion controller as the variable PositionCameraAligned. Then, in step 970, the procedure 900 computes the relative offset between the fiducial-locating (arm-mounted/moving) camera and each respective probe 1-N as a value (in x and y) Offset=PositionCameraAligned−PositionProbeAligned$_P$. These computed offset values are used in subsequent runtime operations (as described above) to control movement of each probe with respect to an object surface.

Figure 10:
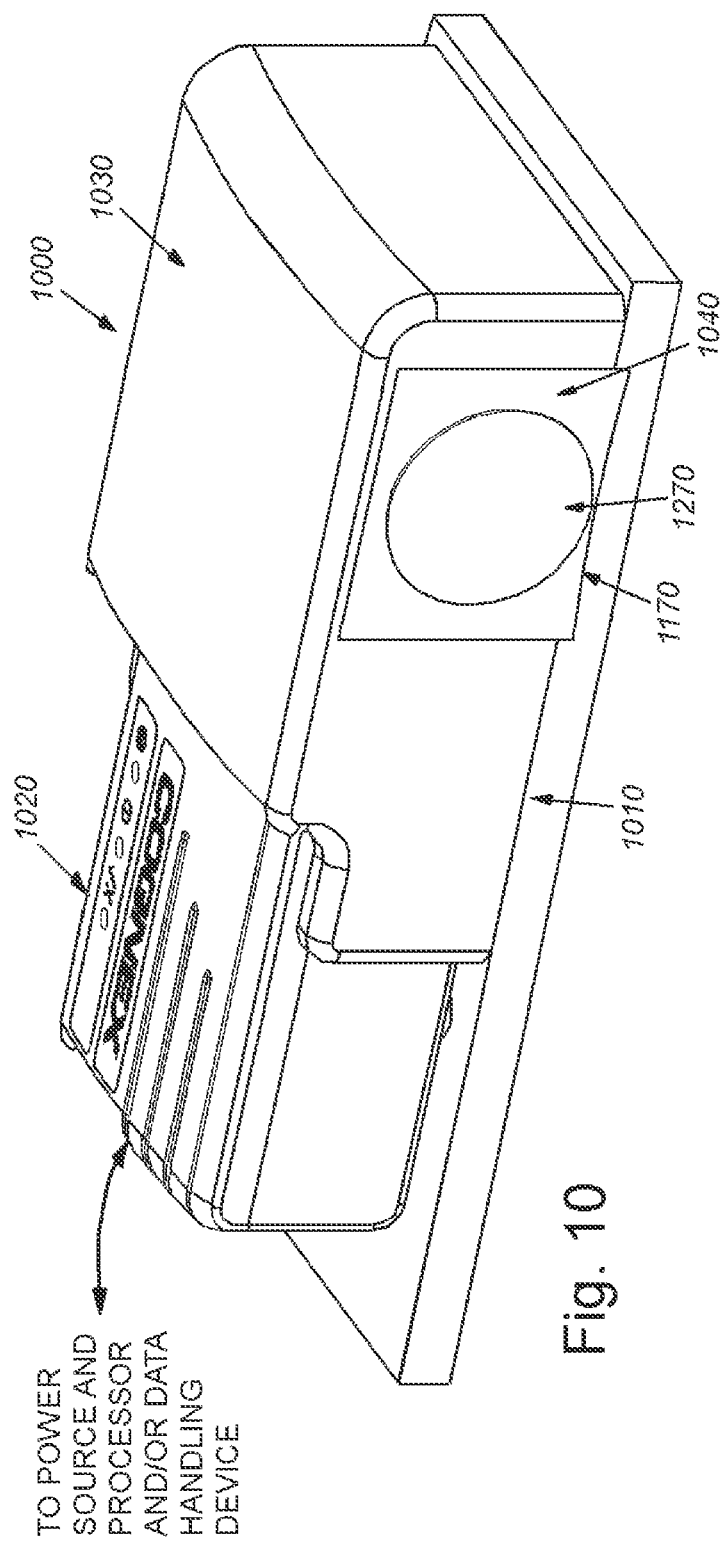
FIG. 10 is a perspective view of an integrated calibration arrangement with a mounting base, camera assembly, optics assembly and housing cover according to an illustrative embodiment.

Reference is now made to FIG. 10, which, along with FIGS. 11-14 depict an integrated (integrally constructed into a single unit from components) calibration arrangement 1000 that includes an on-board vision system camera. This arrangement 1000 is mounted on a base (mounting base) 1010 that defines a plate in this embodiment, but can have any shape appropriate for temporary or permanent mounting in the work area of a CMM (or similar device). The mounting base 1010 supports a vision system camera assembly 1020 according to any of the embodiments herein. The camera assembly 1020 can, thus, include an on-board processor or can transmit image data to a remote processing arrangement as described generally with reference to FIGS. 1 and 7 above. The lens end of the camera assembly 1020 is covered by a removable housing cover 1030, which also encloses and seals-in the optics block 1040 of the arrangement 1000.

The mounting base 1010 and housing cover 1030 can be constructed from a variety of materials using a variety of construction techniques. For example, these components can be constructed from aluminum alloy (or another metal), polymer (e.g. polycarbonate, acrylic, ABS, PET, etc.), composites (e.g. carbon-fiber, glass-filled nylon, etc.). The components are adapted to maintain a rigid alignment between the camera assembly 1020 and optics block 1030 so that calibration remains reliable and repeatable. The optics block can also be constructed from a rigid, sturdy material, such as aluminum alloy or a durable polymer.

Figure 11:
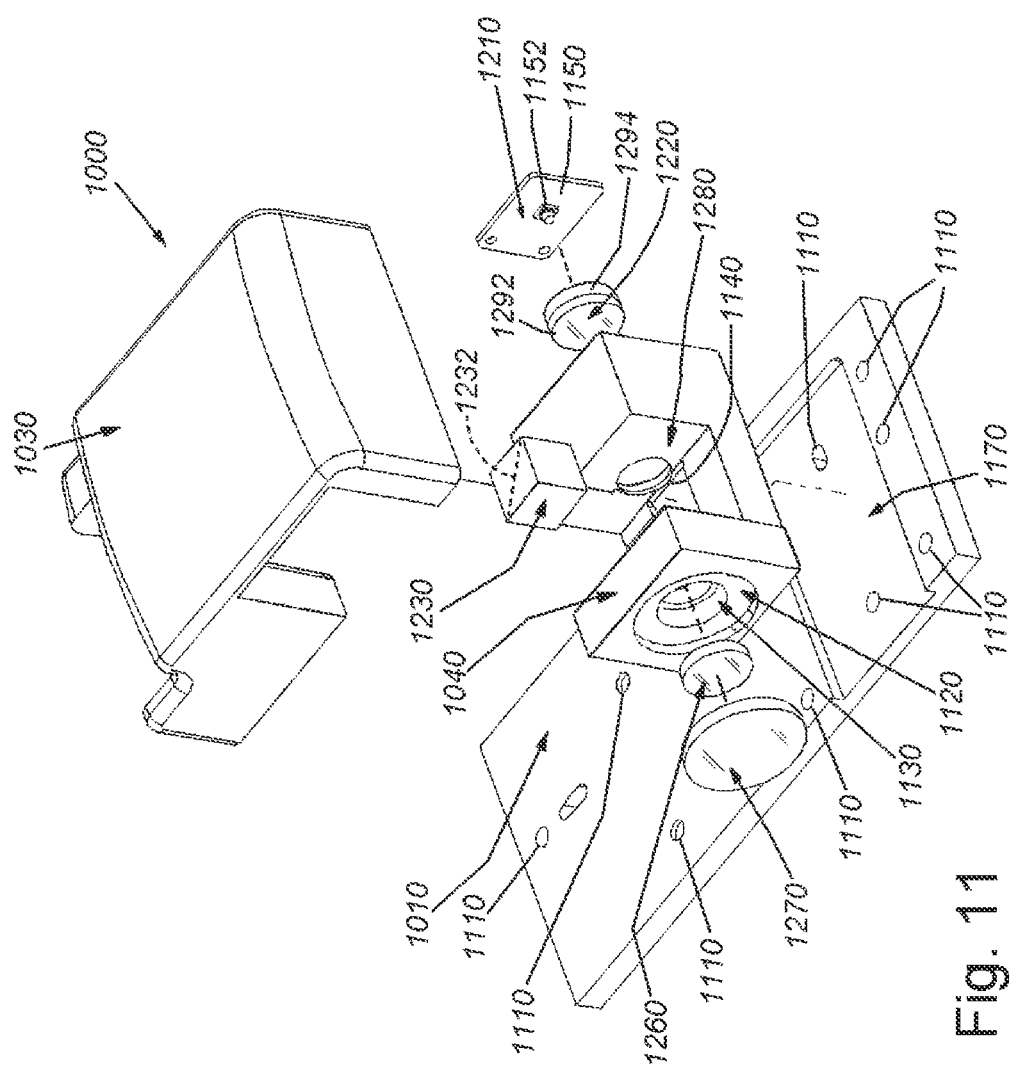
FIG. 11 is an exploded view of the integrated calibration arrangement of FIG. 10, with vision system camera assembly omitted.
Figure 12:
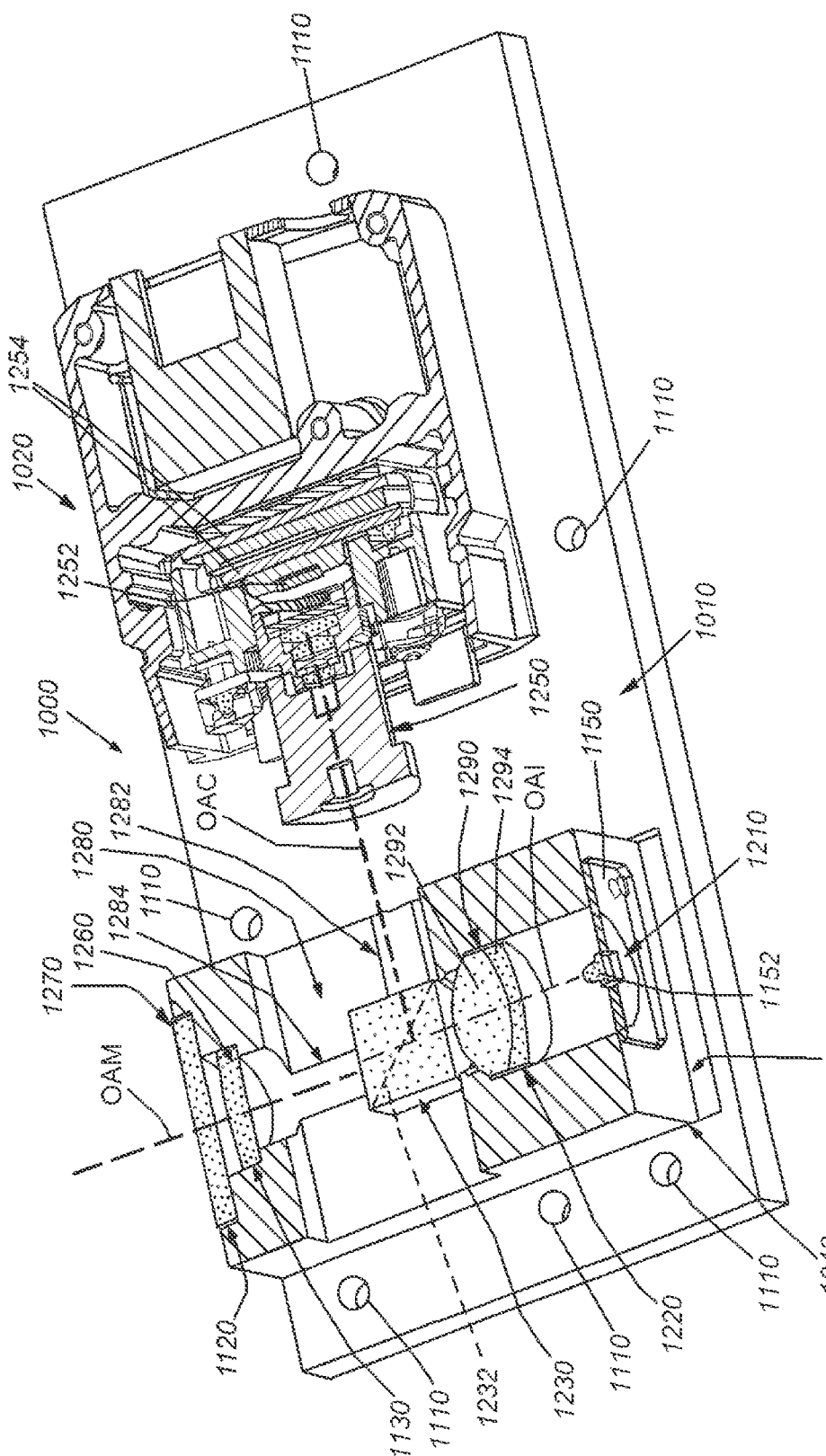
FIG. 12 is a top perspective cross-sectional view of the integrated calibration arrangement of FIG. 10, with housing cover removed.
Figure 13:
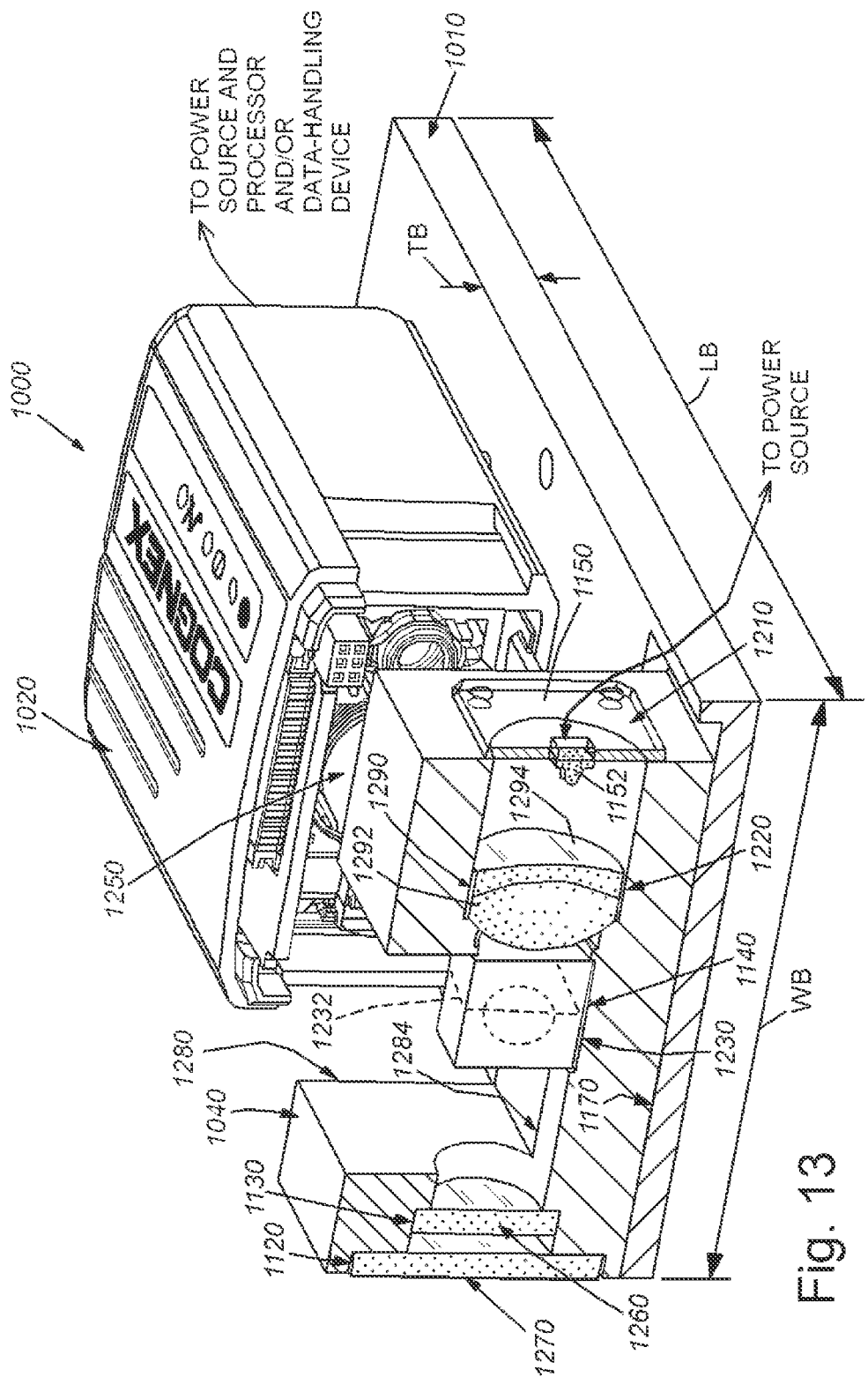
FIG. 13 is a side perspective cross-sectional view, taken through the optics block, of the integrated calibration arrangement of FIG. 10, with housing cover removed.
Figure 14:
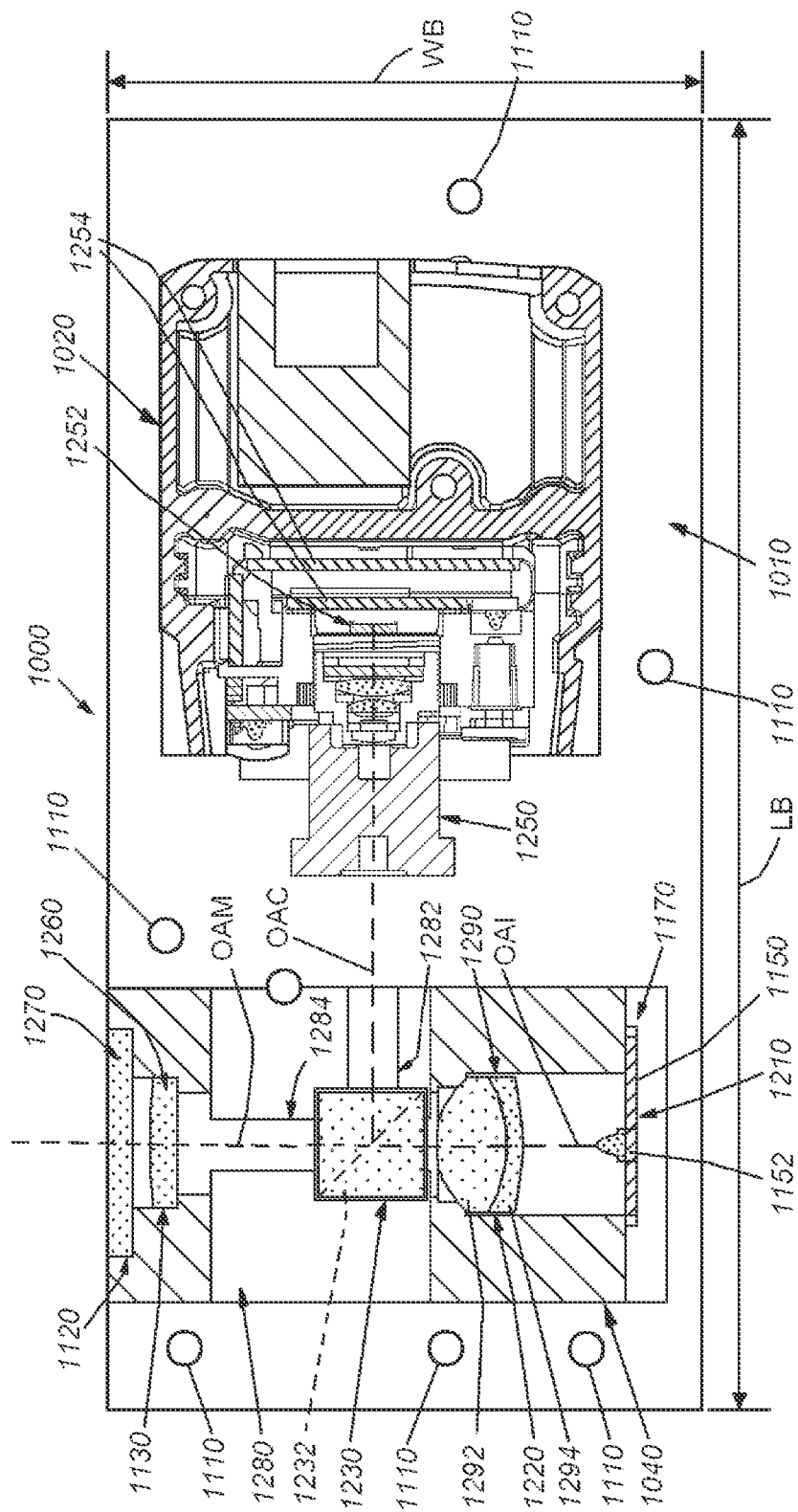
FIG. 14 is a top cross section of the integrated calibration arrangement of FIG. 10, with housing cover removed.

As shown in FIG. 11, the base 1010 includes a series of through-holes 1110 for securing the optics block 1040, cover 1030 and camera assembly 1020 to the base using, for example threaded fasteners (not shown). In alternate arrangements, some or all of the components can be unitarily formed with the base (for example, the optics block) and/or can be secured using another fastening mechanism-such as adhesives, clips, clamps, snap-fits, etc. By way of non-limiting example, and as a reference for approximate size/scale, the overall width WB of the base 1010 is between approximately 45 and 65 millimeters (and illustratively 55.9 millimeters). The overall length LB of the base 1010 is between approximately 110 and 150 millimeters (and illustratively, 120.0 millimeters). The thickness TB (FIG. 13) of the base 1010 (in e.g. 6061-T6 aluminum alloy, or similar) is between approximately 0.3 and 10.0 millimeters (and illustratively 5.0 millimeters). These dimensions are highly variable in alternate embodiments, and/or when employing alternate materials, or construction techniques (e.g. unitary versus integral components).

The base 1010 can also include mounting holes and/or other structures that allow it to be mounted in the work area of a CMM (or similar metrology device) using appropriate bases, brackets and/or other mounting mechanisms. Components can be constructed by molding, casting, machining, 3D-printing and/or any other acceptable technique that provides desired precision and structural integrity to the arrangement 1000.

The optics, function and use of the arrangement 1000 are similar to that described with reference to the embodiment of FIGS. 6-9 above. Briefly, the light from an illumination source 1210 passes through an aspherical lens assembly 1220 and into a beam splitter assembly 1230 along an illumination axis OAI. The light passes axially out of the beam splitter-through a 45-degree-angled reflective surface (dashed line 1232) onto a merged optical axis OAM. Light from a subject (i.e. the tip of a touch probe) is directed back into the arrangement 1000 along the optical axis OAM, onto the reflective surface 1232. The light is redirected 90 degrees onto the camera optical axis OAC, and into the lens assembly 1250 of the camera assembly 1020. The lens assembly can define any appropriate lens power and focal distance setting. In this example, the lens assembly 1250 includes an M12 mounting base in accordance with a conventional arrangement. The camera assembly 1020 in this embodiment is a vision system camera with a sensor 1252 and processor circuit boards 1254. However, any acceptable camera arrangement (with or without (free-of) on-board image processing and vision system processing capabilities) can be employed in alternate embodiments. The merged optical axis OAM passes through a field lens 1260, the function of which is described above, and a transparent reticle plate 1270 that can include a custom fiducial pattern or (as described) a commercially available fiducial pattern.

Figure 15:
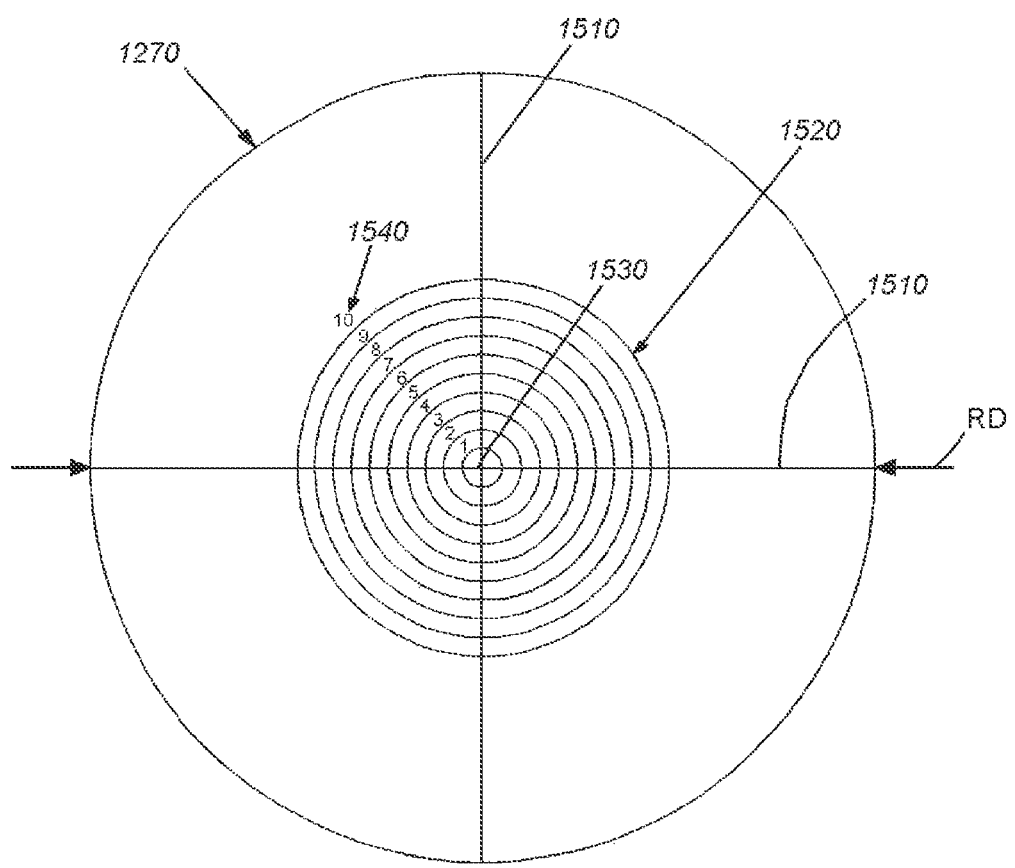
FIG. 15 is a plan view of an illustrative reticle for use with the optics block of the integrated calibration arrangement of FIG. 10.

The spacing of optical components 1210, 1220, 1230, 1260 and 1270 within the optics block 1040, as well as the distance from the sensor 1252 from the beam splitter can be varied based upon the size of the reticle and other system parameters. In this embodiment, the reticle 1270 is shown in further detail in FIG. 15. It defines an outer diameter RD of approximately 21 millimeters and a thickness of approximately 2.2-2.5 millimeters. In an embodiment, and by way of non-limiting example, the reticle 1270 is commercially available from Edmond Optics Inc. of Barrington, N.J. as part number 39454. The reticle fiducial pattern defines perpendicular crosshairs 1510 and a series 1520 of concentric circles spaced at 1-millimeter radial increments from the cross point 1530. Each circle is marked by an associated indicia number 1540. The vision system can be adapted to recognize the circles, cross hairs and/or indicia as appropriate to assist in aligning the touch probe. These features are also clearly visible to a human user via a display (described above) interconnected to the camera assembly(ies) within the arrangement (and mounted on the touch probe arm). The reticle fiducial pattern is etched into the glass substrate (e.g. soda glass with a low-reflection coating), and can be painted or otherwise highlighted for ease of visibility. This is exemplary of a wide variety of shapes, sizes and patters of reticles in accordance with various embodiments.

The reticle 1270 is mounted at the top end of the optics block 1040 flush with or slightly proud of the surrounding surface. A recess 1120 (FIG. 11) is provided to receive the reticle 1270. The reticle, like other optical components can be secured in place in the optics block 1040 by an appropriate commercially available adhesive (e.g. cyanoacrylate, epoxy, etc.), or by another mechanism that should be clear to those of skill, such as threaded rings, clamps, spacers, etc. The reticle serves as the TVS and the VP (described above) for the arrangement. That s, the arm-mounted camera (e.g. camera 640, described above) views, and aligns with, the illuminated reticle 1270 and the touch probe tip (e.g. probe tip 722 described above) is viewed and aligned by the arrangement's camera 1020. Notably, the camera 1020 and other elements of the arrangement 1000 are positioned below the plane of the reticle 1270 to maintain them out of an interfering relationship with the touch probe or workpiece mounted in the CMM. The plane of the reticle 1270 is also generally located at a level similar to a main surface of the workpiece.

The optics block 1040 also includes an inner recess 1130 of the field lens 1260. In this embodiment, the field lens is a plano-convex lens with a diameter of approximately 12 millimeters and a convex face diameter of approximately 51-52 millimeters. The effective focal length is approximately 100 millimeters. By way of non-limiting example, the lens is commercially available from Edmond Optics as part number 47-341. A wide range of alternate field lenses can be employed and/or this lens can be omitted in alternate embodiments. Likewise, in various embodiments, the field lens optics can be integrated with the reticle.

The optics block 1040 includes an open well 1280 in this embodiment in which resides the beam splitter 1230. In an embodiment, the beam splitter 1230 is mounted in a square mounting well 1140 to maintain proper alignment and for greater security. The beam splitter 1230 in this embodiment is a 10-millimeter cube. A version of the beam splitter 1230 is commercially available from Edmond optics as part number 47-121, by way of non-limiting example. However, it is expressly contemplated that a wide range of beam-splitting structures, in a variety of shapes, sizes, and employing operating principles, can be used in alternate embodiments. Note that the open well 1280 includes a semicircular channels 1282 and 1284 aligned along the camera axis OAC and merged axis OAM, respectively. These channels are sufficient to enable full transmission of the desired field of view through the system. While defined as semi-cylinders, in alternate embodiment, the channels 1282, 1284 can be semi-frustoconical in alternate embodiments.

The opposing side of the open well 1280 in the optics block 1040 houses the aspherical lens assembly, which allows for a desired spread of the illumination beam from the source 1210. By way of non-limiting example, the aspherical lens assembly in this embodiment resides in a recess 1290 and is secured in any acceptable manner, as described above. The lens assembly in this embodiment consists of a convex element 1292 and a concave element 1294, with the convex element 1292 located further from the illumination source 1210 than the concave element 1294. The illustrative lens pair is approximately 12.5 millimeters in diameter in this embodiment. The convex element 1292 defines a front radius of approximately 8.15 millimeters and a rear radius of approximately 12.80 millimeters. The convex element 1294 has a rear radius of approximately −24.90 millimeters. The lens assembly is achromatic in this example with an operating wavelength range of between approximately 0.425-0.675 micrometers. The effective focal length is 14 millimeters. By way of non-limiting example, this lens assembly is commercially available from Edmond Optics as part number 49-658. However, as should be clear to those of skill, in alternate embodiments a wide range of possible lenses, prisms and other optical structures can be used to provide desired conditioning to the light of the illumination source 1210.

The illumination source 1210 is mounted in the bottom of the optics block 1040 and defines a circuit board 1150 with a high-output LED (or similar light source) 1152 mounted on the board and facing into the block 1040. The light source 1152 in this embodiment transmits a white light, but any wavelength(s)/color can be employed in alternate embodiments—such as red. The circuit board 1150 can be secured to the block 1040 by fasteners (e.g. machine screws), clips, clamps, snaps, adhesives, or a combination of mechanisms. The illumination source 1210 can powered selectively by a separate power source (e.g. a transformer and wall current) or by a power connection from the camera assembly 1020, or by another power source. In an embodiment, the source 1210 can be selectively illuminated when the calibration device is functioning, based on signals from the vision system processor/process. For example, the camera's on-board illuminators can be bypassed, and power can be, instead, provided to the source 1210 via the circuit board 1150 using an appropriate interconnect cable or other power-lead arrangement.

The optics block 1040 can be removably mounted on the base 1010 within an illustrative recess 1170. Illustratively, the recess or other mounting arrangement can be adapted to receive a variety of optics assemblies adapted to specific CMM parameters (or for use with other vision system applications).

It should be clear that the above-described system and method for calibrating a touch probe using a vision system provides a relatively straightforward calibration technique and accurate calibration result. Advantageously, this technique relies upon direct viewing of the probe contact point relative to a target/fiducial on a common surface plane of a calibration fixture, ensuring that a mapping of coordinates between the touch probe's contact point and the camera field of view is as accurate as possible. A variety of integrated illumination assemblies/arrangements within the calibration fixture offer enhanced contrast for identifying and localizing the touch probe contact point relative to a fiducial in an acquired image. Additionally, the above-described system and method effectively calibrates multiple touch probes on a moving arm, stage or robot assembly. The system can be implemented in an integrated, modular package that is self-contained and sealed against infiltration by contaminants. The package can be adapted to change-out of key components, such as the camera or optics to allow for varied missions and situations.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientational terms such as "vertical", "horizontal", "up", "down", "bottom", "top", "side", "front", "rear", "left", "right", and the like, are used only as relative conventions and not as absolute orientations with respect to a fixed coordinate system, such as gravity. Additionally, the term "prism" should be taken broadly to include other structures that can be placed to underlie the work area. For example, an arrangement of mirrors that define generally the depicted optical path OP can be employed. A combination of prismatic and reflective (specular) structures can also be employed in various embodiments. Accordingly, this description is meant to be taken only by way of example, and not to otherwise limit the scope of this invention.

What is claimed is:

1. A vision system for guiding a touch probe assembly comprising:
    a calibration fixture having a fiducial arranged to contact a touch probe in response to movement between the touch probe assembly and the calibration fixture, the calibration fixture including an optics block disposed on a mounting base and comprising:
        an illumination source configured to provide illumination light;
        a beamsplitter that allows both the illumination light to pass through the fiducial and a first optical path that is turned through an angle for viewing through the fiducial into a space thereabove that contains the touch probe assembly; and
        a reticle adapted to contact the touch probe, the reticle comprising a fiducial pattern and a light-conditioning lens positioned between the illumination light and the beamsplitter;
    a first vision system camera assembly located with respect to the beamsplitter having a first camera axis located along the first optical path;
    a second vision system camera assembly mounted rigidly with respect to the touch probe assembly via the mounting base, and having a second camera axis configured to view the fiducial as illuminated by the illumination source.

2. The vision system as set forth in claim 1 further comprising a plurality of touch probe assemblies each selectively movable with respect to the fixture to each selectively contact the fiducial, respectively, and each of the touch probe assemblies rigidly attached with respect to the second camera assembly.

3. The vision system as set forth in claim 1 further comprising a field lens assembly located in the first optical path to reduce parallax generated by reflected light from the touch probe and balance illumination across a field of view of the second vision system camera assembly.

4. The vision system as set forth in claim 1 wherein the touch probe assembly is located on a moving arm of a coordinate measuring machine (CMM).

5. The vision system as set forth in claim 4 wherein the CMM includes a controller that tracks motion of the arm and wherein each of the first vision system camera and the second vision system camera provide feedback for recording a position of the arm based upon the controller when, respectively, the touch probe contacts the fiducial and the second camera axis is aligned with the fiducial.

6. The vision system as set forth in claim 5 wherein the position is employed to compute an offset between the second camera axis and the touch probe and is stored for use in runtime to assist in guiding the arm with respect to a runtime object.

7. The vision system as set forth in claim 1, wherein the light-conditioning lens comprises an aspheric lens assembly with a concave and a convex lens pair.

8. The vision system as set forth in claim 1, further comprising a field lens located between the reticle and the beamsplitter.

9. The vision system as set forth in claim 1, further comprising a housing cover mounted over the optics block and at least a portion of the second vision system camera.

10. The vision system as set forth in claim 1, wherein the light source is a circuit board with an LED assembly mounted thereon, the circuit board mounted on an end of the optics block opposite an end of the optics block on which the reticle is mounted.

11. A vision system for guiding a touch probe assembly comprising:
- a calibration fixture having the fiducial arranged to contact a touch probe in response to movement between the touch probe assembly and the calibration fixture, the calibration fixture including a beamsplitter that allows both illumination light to pass from a source through the fiducial and a first optical path that is turned through an angle for viewing through the fiducial into a space thereabove that contains the touch probe assembly;
- a first vision system camera assembly located with respect to the beamsplitter having a first camera axis located along the first optical path;
- a second vision system camera assembly mounted rigidly with respect to the touch probe assembly and having a second camera axis configured to view the fiducial as illuminated by the source,
- wherein the beamsplitter and the source are mounted in an optics block with respect to a mounting base that supports the second vision system camera,
- wherein the optics block has a reticle adapted to contact the touch probe, the reticle having a fiducial pattern, and a light-conditioning lens between the illumination light and the beamsplitter.

12. The vision system as set forth in claim 1, wherein the calibration fixture further comprises a field lens and the field lens is located between the fiducial and the beamsplitter.

* * * * *